US 12,453,461 B2

(12) United States Patent
Tran et al.

(10) Patent No.: US 12,453,461 B2
(45) Date of Patent: Oct. 28, 2025

(54) SYSTEMS AND METHODS FOR CONNECTING A MEDICAL IMAGING DEVICE TO A MEDICAL IMAGING CONTROLLER

(71) Applicant: Stryker Corporation, Kalamazoo, MI (US)

(72) Inventors: Levey Tran, Denver, CO (US); Robert Jones, III, South Bend, IN (US); Rohit Subramanian, San Jose, CA (US)

(73) Assignee: Stryker Corporation, Portage, MI (US)

( * ) Notice: Subject to any disclaimer, the term of this patent is extended or adjusted under 35 U.S.C. 154(b) by 111 days.

(21) Appl. No.: 16/741,461

(22) Filed: Jan. 13, 2020

(65) Prior Publication Data

US 2020/0221933 A1    Jul. 16, 2020

Related U.S. Application Data

(60) Provisional application No. 62/791,828, filed on Jan. 13, 2019.

(51) Int. Cl.
*A61B 1/00*      (2006.01)
*A61B 90/00*    (2016.01)
(Continued)

(52) U.S. Cl.
CPC ...... *A61B 1/00114* (2013.01); *A61B 1/00006* (2013.01); *A61B 1/00009* (2013.01);
(Continued)

(58) Field of Classification Search
CPC ............ A61B 1/00114; A61B 1/00006; A61B 1/00009; A61B 1/00057; A61B 1/00062;
(Continued)

(56) References Cited

U.S. PATENT DOCUMENTS

| 4,445,555 A | 5/1984 | Klempirik |
| 5,428,386 A * | 6/1995 | D'Alfonso ............. H04N 25/00 |
| | | 348/45 |

(Continued)

FOREIGN PATENT DOCUMENTS

| CN | 201515041 U | 6/2010 |
| CN | 107928686 A | 4/2018 |

(Continued)

OTHER PUBLICATIONS

Notice of Reasons for Refusal dated Nov. 13, 2023, directed to JP Application No. 2021-540458; 10 pages.
(Continued)

*Primary Examiner* — Anh Tuan T Nguyen
*Assistant Examiner* — Shankar Raj Ghimire
(74) *Attorney, Agent, or Firm* — Morrison & Foerster LLP

(57) ABSTRACT

A cable for connecting a medical imaging device to a medical imaging controller includes a first connector located at a distal end of the cable for connecting to the imaging device, a second connector located at a proximal end for connecting to the medical imaging controller, a circuit board comprising at least one memory that stores at least authentication information associated with the cable. The circuit board is communicatively connected via a communication bus on the circuit board to the second connector for enabling access to the authentication information by the medical imaging controller. One or more imaging communication lines extend between the first connector and the second connector for communicating imaging data from the medical imaging device to the medical imaging controller. The one or more imaging communication lines bypass the communication bus on the circuit board.

17 Claims, 10 Drawing Sheets

(51) Int. Cl.
  *A61B 90/20*    (2016.01)
  *G06F 13/40*    (2006.01)
  *G06F 21/44*    (2013.01)
  *G16H 30/40*    (2018.01)
  *G16H 40/63*    (2018.01)

(52) U.S. Cl.
  CPC ...... *A61B 1/00057* (2013.01); *A61B 1/00059* (2013.01); *A61B 1/00062* (2013.01); *A61B 1/00124* (2013.01); *A61B 90/20* (2016.02); *A61B 90/361* (2016.02); *G06F 13/409* (2013.01); *G06F 21/44* (2013.01); *G06F 21/445* (2013.01); *G16H 30/40* (2018.01); *G16H 40/63* (2018.01)

(58) Field of Classification Search
  CPC ... A61B 1/00124; A61B 90/20; A61B 90/361; A61B 1/00059; G16H 30/40; G16H 40/63; G06F 21/44
  See application file for complete search history.

(56) References Cited

U.S. PATENT DOCUMENTS

| | | | | |
|---|---|---|---|---|
| 5,812,796 | A * | 9/1998 | Broedner | G06F 13/4291 710/302 |
| 5,896,166 | A * | 4/1999 | D'Alfonso | H04N 23/66 348/E5.043 |
| 6,725,282 | B1 * | 4/2004 | Grzybowski | G06F 1/163 710/48 |
| 6,971,887 | B1 * | 12/2005 | Trobough | H05K 7/1092 439/71 |
| 7,268,581 | B1 * | 9/2007 | Trimberger | H03K 19/17736 326/38 |
| 7,471,310 | B2 | 12/2008 | Amling et al. | |
| 7,551,196 | B2 | 6/2009 | Ono et al. | |
| 7,821,530 | B2 | 10/2010 | Amling et al. | |
| 8,525,875 | B2 | 9/2013 | Kawata et al. | |
| 8,617,055 | B2 | 12/2013 | Kanno et al. | |
| 9,526,407 | B2 | 12/2016 | Hoeg et al. | |
| 9,622,808 | B2 | 4/2017 | Beller et al. | |
| 9,962,064 | B2 | 5/2018 | Laser et al. | |
| 10,615,554 | B2 * | 4/2020 | Truluck | G06F 21/44 |
| 10,660,505 | B2 * | 5/2020 | Irion | G01N 21/59 |
| 10,809,408 | B1 * | 10/2020 | Olsson | G01V 3/165 |
| 11,925,326 | B1 * | 3/2024 | Dawoodjee | A61B 1/00048 |
| 2004/0038169 | A1 * | 2/2004 | Mandelkern | A61B 1/24 433/29 |
| 2004/0111029 | A1 * | 6/2004 | Bates | H01R 13/5224 600/437 |
| 2006/0156415 | A1 * | 7/2006 | Rubinstein | G06F 21/602 726/27 |
| 2008/0225134 | A1 | 9/2008 | Amling et al. | |
| 2009/0061678 | A1 * | 3/2009 | Minoo | G06F 21/44 439/502 |
| 2009/0124855 | A1 | 5/2009 | Urakawa | |
| 2012/0064758 | A1 * | 3/2012 | Grice | H01R 13/641 439/490 |
| 2014/0088440 | A1 * | 3/2014 | Swart | G16H 80/00 600/476 |
| 2014/0118518 | A1 | 5/2014 | Fructus | |
| 2014/0160308 | A1 * | 6/2014 | Alm | H04N 5/23299 348/207.11 |
| 2014/0210989 | A1 * | 7/2014 | Olsson | G01N 21/954 348/84 |
| 2014/0266577 | A1 * | 9/2014 | Anderson | A61B 5/6851 340/5.2 |
| 2014/0275765 | A1 * | 9/2014 | Gebhart | G01B 9/02044 600/125 |
| 2014/0327751 | A1 | 11/2014 | King et al. | |
| 2015/0005630 | A1 * | 1/2015 | Jung | G16H 30/40 600/437 |
| 2015/0155912 | A1 | 6/2015 | Winward | |
| 2015/0333545 | A1 * | 11/2015 | Luce | H02J 7/00 320/137 |
| 2016/0331216 | A1 * | 11/2016 | Kaneko | A61B 1/045 |
| 2017/0164717 | A1 | 6/2017 | Tribbett | |
| 2017/0371573 | A1 * | 12/2017 | Kim | G06F 3/0619 |
| 2018/0101493 | A1 * | 4/2018 | Tominaga | G06F 1/266 |
| 2018/0103923 | A1 * | 4/2018 | Meiler | A61B 6/4417 |
| 2018/0115130 | A1 * | 4/2018 | Truluck | H02J 7/00036 |
| 2018/0120906 | A1 * | 5/2018 | Reed | H05K 7/1487 |
| 2018/0192864 | A1 * | 7/2018 | Yazdi | A61B 1/045 |
| 2020/0221933 | A1 * | 7/2020 | Tran | A61B 90/361 |
| 2021/0161031 | A1 * | 5/2021 | Wang | H05K 7/20172 |
| 2021/0244261 | A1 * | 8/2021 | Ushiroda | H04N 5/23229 |
| 2023/0054506 | A1 * | 2/2023 | Lee | H01R 13/5812 |

FOREIGN PATENT DOCUMENTS

| | | | |
|---|---|---|---|
| CN | 107943260 | A | 4/2018 |
| EP | 2034423 | A2 | 3/2009 |
| JP | 2010-503134 | A | 1/2010 |
| JP | 2010-66409 | A | 3/2010 |
| JP | 2018-61823 | A | 4/2018 |
| JP | 2018-63530 | A | 4/2018 |
| WO | 2013158314 | A2 | 10/2013 |
| WO | WO-2014145778 | A1 * | 9/2014 ........... G01N 21/954 |

OTHER PUBLICATIONS

The First Office Action dated Jul. 6, 2024, directed to CN Application No. 202080020327.9; 14 pages.
Notice of Allowance dated Jul. 26, 2024, directed to Japanese Application No. 2021-540458; 5 pages.
Second Office Action dated Dec. 31, 2024, directed to CN Application No. 202080020327.9; 18 pages.
Intention to Grant dated Apr. 16, 2025, directed to EP Application No. 20 704 700.2; 8 pages.
Notice of Reasons for Refusal dated Feb. 28, 2025, directed to JP Application No. 2024-141166; 4 pages.
Notification to Grant Patent Right for Invention dated May 9, 2025, directed to CN Application No. 202080020327.9; 7 pages.
International Preliminary Report on Patentability dated Jun. 16, 2021, directed to International Application No. PCT/US2020/013380; 9 pages.
International Search Report and Written Opinion mailed Jun. 23, 2020, directed to International Application No. PCT/US2020/013380; 17 pages.
Invitation to Pay Additional Fees mailed Apr. 15, 2020, directed to International Application No. PCT/US2020/013380; 12 pages.
Office Action dated Jul. 19, 2022, directed to EP Application No. 20 704 700.2; 5 pages.
Office Action dated May 23, 2023, directed to EP Application No. 20 704 700.2; 6 pages.
Decision to Grant a Patent dated Sep. 1, 2025, directed to JP Application No. 2024-141166; 5 pages.

* cited by examiner

SYSTEMS AND METHODS FOR CONNECTING A MEDICAL IMAGING DEVICE TO A MEDICAL IMAGING CONTROLLER

CROSS-REFERENCE TO RELATED APPLICATIONS

This application claims the benefit of U.S. Provisional Application No. 62/791,828, filed Jan. 13, 2019, the entire contents of which are hereby incorporated by reference herein.

FIELD OF THE INVENTION

The present invention generally relates to medical imaging, and more specifically to connecting medical imaging devices to medical imaging controllers.

BACKGROUND OF THE INVENTION

Medical systems, instruments or tools are utilized pre-surgery, during surgery, or post-operatively for various purposes. Some of these medical tools may be used in what are generally termed endoscopic procedures or open field procedures. For example, endoscopy in the medical field allows internal features of the body of a patient to be viewed without the use of traditional, fully invasive surgery. Endoscopic imaging systems incorporate endoscopes to enable a surgeon to view a surgical site, and endoscopic tools enable minimally invasive surgery at the site. Such tools may be shaver-type devices which mechanically cut bone and hard tissue, or radio frequency (RF) probes which are used to remove tissue via ablation or to coagulate tissue to minimize bleeding at the surgical site, for example.

In endoscopic surgery, the endoscope is placed in the body at the location at which it is necessary to perform a surgical procedure. Other surgical instruments, such as the endoscopic tools mentioned above, are also placed in the body at the surgical site. A surgeon views the surgical site through the endoscope in order to manipulate the tools to perform the desired surgical procedure. Some endoscopes are usable along with a camera head for the purpose of processing the images received by the endoscope. An endoscopic camera system typically includes a camera head connected to a camera control unit (CCU) by a cable. The CCU processes input image data received from the image sensor of the camera via the cable and then outputs the image data for display. The resolution and frame rates of endoscopic camera systems are ever increasing and each component of the system must be designed accordingly.

Another type of medical imager that can include a camera head connected to a CCU by a cable is an open-field imager. Open-field imagers can be used to image open surgical fields, such as for visualizing blood flow in vessels and related tissue perfusion during plastic, microsurgical, reconstructive, and gastrointestinal procedures.

The camera heads of endoscopic imaging systems, open-field imaging systems, and other types of medical imaging systems may be specialized, having different forms and functionalities for various medical specialties and/or procedures. The CCU may process imaging data differently depending on the type of camera head. Accordingly, it is desirable for the CCU to be able to identify and have information regarding the camera head. This information can be used for a variety of different purposes to achieve the best accuracy and desired display for the user.

SUMMARY OF THE INVENTION

According to some embodiments, a cable for connecting a camera head to a CCU includes a printed circuit board that is integrated into the cable for enabling a connected CCU to authenticate the cable. The printed circuit board may include an authentication component that allows secure storage of authentication information, such as an encryption key, and that performs the operations required for encrypted communication with the CCU to enable secure confirmation that the proper cable is being used, which can help ensure optimal performance of the imaging system. In some embodiments, the circuit board includes one or more components storing information about the camera head and the cable itself. The authentication capability in the cable ensures that this camera head and cable information can be trusted.

According to some embodiments, a cable for connecting a medical imaging device to a medical imaging controller includes a first connector located at a distal end of the cable for connecting the cable to a medical imaging device, and a second connector located at a proximal end of the cable for connecting the cable to a medical imaging controller. The cable includes a circuit board comprising at least one memory, wherein the at least one memory stores at least authentication information associated with the cable and the circuit board is communicatively connected via a communication bus on the circuit board to the second connector for enabling access to the authentication information by a medical imaging controller connected to the second connector. The cable includes one or more imaging communication lines extending between the first connector and the second connector for communicating imaging data from a medical imaging device connected to the first connector to a medical imaging controller connected to the second connector, wherein the one or more imaging communication lines bypass the communication bus on the circuit board.

In any of these embodiments, the at least one memory may further store identification information for identifying a medical imaging device that is associated with the cable.

In any of these embodiments, the at least one memory may include a plurality of memories.

In any of these embodiments, the authentication information may be stored on a memory, such as a memory of an authentication chip, on the circuit board and the identification information may be stored on a separate memory on the circuit board.

In any of these embodiments, the circuit board may include one or more processors for facilitating communication between the medical imaging controller and at least a portion of the at least one memory.

In any of these embodiments, the one or more processors may be configured to facilitate communication of one or more medical imaging device calibration parameters stored in the at least a portion of the at least one memory to the medical imaging controller.

In any of these embodiments, the cable may further include at least one auxiliary communication line extending between the first connector and the circuit board for communicating at least non-imaging data from the medical imaging device to or through the circuit board.

In any of these embodiments, the communication bus may be communicatively coupled to the second connector and the at least one auxiliary communication line may be connected to the communication bus.

In any of these embodiments, at least a portion of the at least one memory may be directly connected to the communication bus.

In any of these embodiments, the circuit board may be located in the proximal end of the cable.

In any of these embodiments, the circuit board may be integrally formed as part of the cable.

In any of these embodiments, the circuit board may be overmolded to protect the circuit board during sterilization of the cable.

In any of these embodiments, the cable may further include a second circuit board located proximate the first connector.

In any of these embodiments, the at least one memory may store at least one of medical imaging device run time, medical imaging device type, medical imaging device usage count, medical imaging device button operation count, cable identification information, cable type, medical imaging device identification information, medical imaging device calibration information, and medical imaging device pixel compensation information.

In any of these embodiments, one or more imaging control lines may extend between the first connector and the second connector for communicating imaging control signals from a medical imaging controller connected to the second connector to a medical imaging device connected to the first connector, wherein the one or more imaging control lines bypass the communication bus of the circuit board.

In any of these embodiments, the first connector may be configured for connecting to at least one of an endoscope camera head, a medical microscope camera head, and an open field medical camera head.

In any of these embodiments, the one or more imaging communication lines may be configured for communicating at least one of pixel data and voxel data.

According to some embodiments, an apparatus includes a medical imaging device connected to a cable that includes a first connector located at a distal end of the cable for connecting the cable to a medical imaging device, a second connector located at a proximal end of the cable for connecting the cable to a medical imaging controller, a circuit board comprising at least one memory, wherein the at least one memory stores at least authentication information associated with the cable and the circuit board is communicatively connected via a communication bus on the circuit board to the second connector for enabling access to the authentication information by a medical imaging controller connected to the second connector; and one or more imaging communication lines extending between the first connector and the second connector for communicating imaging data from a medical imaging device connected to the first connector to a medical imaging controller connected to the second connector, wherein the one or more imaging communication lines bypass the communication bus on the circuit board.

In any of these embodiments, the at least one memory may further stores identification information for the medical imaging device.

In any of these embodiments, the at least one memory may include a plurality of memories.

In any of these embodiments, the authentication information may be stored on a memory of an authentication chip on the circuit board and the identification information may be stored on a separate memory on the circuit board.

In any of these embodiments, the circuit board may include one or more processors for facilitating communication between the medical imaging controller and at least a portion of the at least one memory.

In any of these embodiments, the one or more processors may be configured to facilitate communication of one or more medical imaging device calibration parameters stored in the at least a portion of the at least one memory.

In any of these embodiments, the apparatus may further include at least one auxiliary communication line extending between the first connector and the circuit board for communicating at least non-imaging data from the medical imaging device to the circuit board.

In any of these embodiments, the communication bus may be communicatively coupled to the second connector and the at least one auxiliary communication line may be connected to the communication bus.

In any of these embodiments, at least a portion of the at least one memory may be directly connected to the communication bus.

In any of these embodiments, the circuit board may be located in the proximal end of the cable.

In any of these embodiments, the circuit board may be integrally formed as part of the cable.

In any of these embodiments, the circuit board may be overmolded to protect the circuit board during sterilization of the cable.

In any of these embodiments, the cable may include a second circuit board located proximate the first connector.

In any of these embodiments, the at least one memory may store at least one of medical imaging device run time, medical imaging device type, medical imaging device usage count, medical imaging device button operation count, cable identification information, cable type, medical imaging device identification information, medical imaging device calibration information, and medical imaging device pixel compensation information.

In any of these embodiments, the cable may further include one or more imaging control lines extending between the first connector and the second connector for communicating imaging control signals from a medical imaging controller connected to the second connector to a medical imaging device connected to the first connector, wherein the one or more imaging control lines bypass the communication bus of the circuit board.

In any of these embodiments, the medical imaging device may be an endoscopic camera head, a medical microscope camera head, or an open field medical camera head.

In any of these embodiments, the one or more imaging communication lines may be configured for communicating at least one of pixel data and voxel data.

According to some embodiments, a medical imaging system includes a medical imaging device, a medical imaging controller, and a cable connecting the medical imaging device to the medical imaging controller, wherein the medical imaging controller comprises one or more processors, memory, and one or more programs stored in the memory for execution by the one or more processors, the one or more programs including instruction for: accessing cable authentication information stored in at least one memory of a circuit board of the cable, and authenticating the cable based on the cable authentication information stored in the at least one memory.

In any of these embodiments, the cable may include a first connector located at a distal end of the cable and connecting the cable to the medical imaging device; a second connector located at a proximal end of the cable and connecting the cable to the medical imaging controller; and one or more imaging communication lines extending between the first connector and the second connector for communicating imaging data from the medical imaging device to the medical imaging controller, wherein the circuit board is communicatively connected via a communication bus on the circuit board to the second connector for enabling access to the authentication information by the medical imaging controller connected to the second connector and the one or more imaging communication lines bypass the communication bus on the circuit board.

In any of these embodiments, the circuit board may be integrally formed as part of the cable.

In any of these embodiments, the one or more programs may include instructions for providing an un-authenticated cable warning in accordance with unsuccessful authentication of the cable.

In any of these embodiments, the one or more programs may include instructions for accessing medical imaging device identification information stored in the at least one memory and controlling the medical imaging device based on the medical imaging device identification information.

In any of these embodiments, the one or more programs may include instructions for communicating with one or more processors of the circuit board to retrieve one or more medical imaging device calibration parameters stored in the at least one memory.

In any of these embodiments, the one or more programs may include instructions for communicating with one or more non-imaging components in the medical imaging device via a communication bus on the circuit board.

In any of these embodiments, the one or more programs may include instructions for receiving imaging data from the medical imaging device via one or more imaging communication lines in the cable, wherein the imaging communication lines bypass the circuit board.

According to some embodiments, a method of authenticating a cable by a medical imaging controller that is connected to a medical imaging device by the cable, the medical imaging controller comprising one or more processors, memory, and one or more programs stored in the memory for execution by the one or more processors, includes accessing cable authentication information stored in at least one memory of a circuit board of the cable; and authenticating the cable based on the cable authentication information stored in the at least one memory.

In any of these embodiments, the cable may include a first connector located at a distal end of the cable and connecting the cable to the medical imaging device, a second connector located at a proximal end of the cable and connecting the cable to the medical imaging controller, and one or more imaging communication lines extending between the first connector and the second connector for communicating imaging data from the medical imaging device to the medical imaging controller, wherein the circuit board is communicatively connected via a communication bus on the circuit board to the second connector for enabling access to the authentication information by the medical imaging controller connected to the second connector and the one or more imaging communication lines bypass the communication bus on the circuit board.

In any of these embodiments, the circuit board may be integrally formed as part of the cable.

In any of these embodiments, the method may include providing an un-authenticated cable warning in accordance with unsuccessful authentication of the cable.

In any of these embodiments, the one or more programs include instructions for accessing medical imaging device identification information stored in the at least one memory and controlling the medical imaging device based on the medical imaging device identification information.

In any of these embodiments, the method may further include communicating with one or more processors of the circuit board to retrieve one or more medical imaging device calibration parameters stored in the at least one memory.

In any of these embodiments, the method may further include communicating with one or more non-imaging components in the medical imaging device via a communication bus on the circuit board.

In any of these embodiments, the method may further include receiving imaging data from the medical imaging device via one or more imaging communication lines in the cable, wherein the imaging communication lines bypass the circuit board.

According to some embodiments, a non-transitory tangible computer-readable medium has computer-executable program code embedded thereon to perform any of the methods above.

According to some embodiments, a computer program product includes computer implementable instructions which when implemented by a programmable computer cause the computer to perform any of the method above.

According to some embodiments, a method of imaging tissue of a subject includes authenticating a cable by a medical imaging controller that is connected to a medical imaging device by the cable, the medical imaging controller comprising one or more processors, memory, and one or more programs stored in the memory for execution by the one or more processors, the one or more programs including instruction for: accessing cable authentication information stored in at least one memory of a circuit board integrally formed as part of the cable, and authenticating the cable based on the cable authentication information stored in the at least one memory; and generating a time series of images of tissue of a subject using the medical imaging device and the authenticated cable.

In any of these embodiments, generating the time series of images of tissue of the subject may include generating a time series of fluorescence images of the tissue of the subject.

In any of these embodiments, the method may further include administering a fluorescence imaging agent to the subject prior to generating the time series of fluorescence images of the tissue of the subject.

According to some embodiments, a kit for processing a time series of images of tissue of a subject includes any of the cables described above, any of the apparatuses described above, any of the systems described above, or the non-transitory tangible computer-readable medium described above.

In any of these embodiments, the imaging agent may be a fluorescence imaging agent. The fluorescence imaging agent may be or comprises tricarbocyanine dye, ICG, methylene blue, fluorescein isothiocyanate, rhodamine, phycoerythrin, phycocyanin, allophycocyanin, o-phthaldehyde, fluorescamine, rose Bengal, trypan blue, fluoro-gold, or a combination thereof. In some embodiments, an analogue or a derivative of the fluorescence imaging agent may be used.

According to some embodiments, a fluorescence imaging agent is for use in any of the systems above, in any of the methods above, or in any of the kits above for imaging tissue.

In any of these embodiments, imaging tissue may include imaging the tissue during blood flow imaging, tissue perfusion imaging, lymphatic imaging, or a combination thereof.

In any of these embodiments, blood flow imaging, tissue perfusion imaging, and/or lymphatic imaging may include blood flow imaging, tissue perfusion imaging, and/or lymphatic imaging during an invasive medical procedure, a minimally invasive medical procedure, or during a non-invasive medical procedure.

In any of these embodiments, the invasive medical procedure may include a cardiac-related medical procedure or a reconstructive medical procedure.

In any of these embodiments, the cardiac-related medical procedure may include a cardiac coronary artery bypass graft (CABG) procedure.

In any of these embodiments, the CABG procedure may be on pump or off pump.

In any of these embodiments, the non-invasive medical procedure may include a wound care procedure.

In any of these embodiments, the lymphatic imaging may include identification of a lymph node, lymph node drainage, lymphatic mapping, or a combination thereof.

In any of these embodiments, the lymphatic imaging may relate to the female reproductive system.

According to some embodiments, any of the cables above, any of the apparatuses above, any of the systems above, any of the methods above, any of the kits above, or any of the fluorescence agents above, are used for lymphatic imaging.

According to some embodiments, any of the cables above, any of the apparatuses above, any of the systems above, any of the methods above, any of the kits above, or any of the fluorescence agents above, are used for blood flow imaging, tissue perfusion imaging, or a combination thereof.

BRIEF DESCRIPTION OF THE DRAWINGS

The invention will now be described, by way of example only, with reference to the accompanying drawings, in which.

DETAILED DESCRIPTION OF THE INVENTION

Figure 1A:
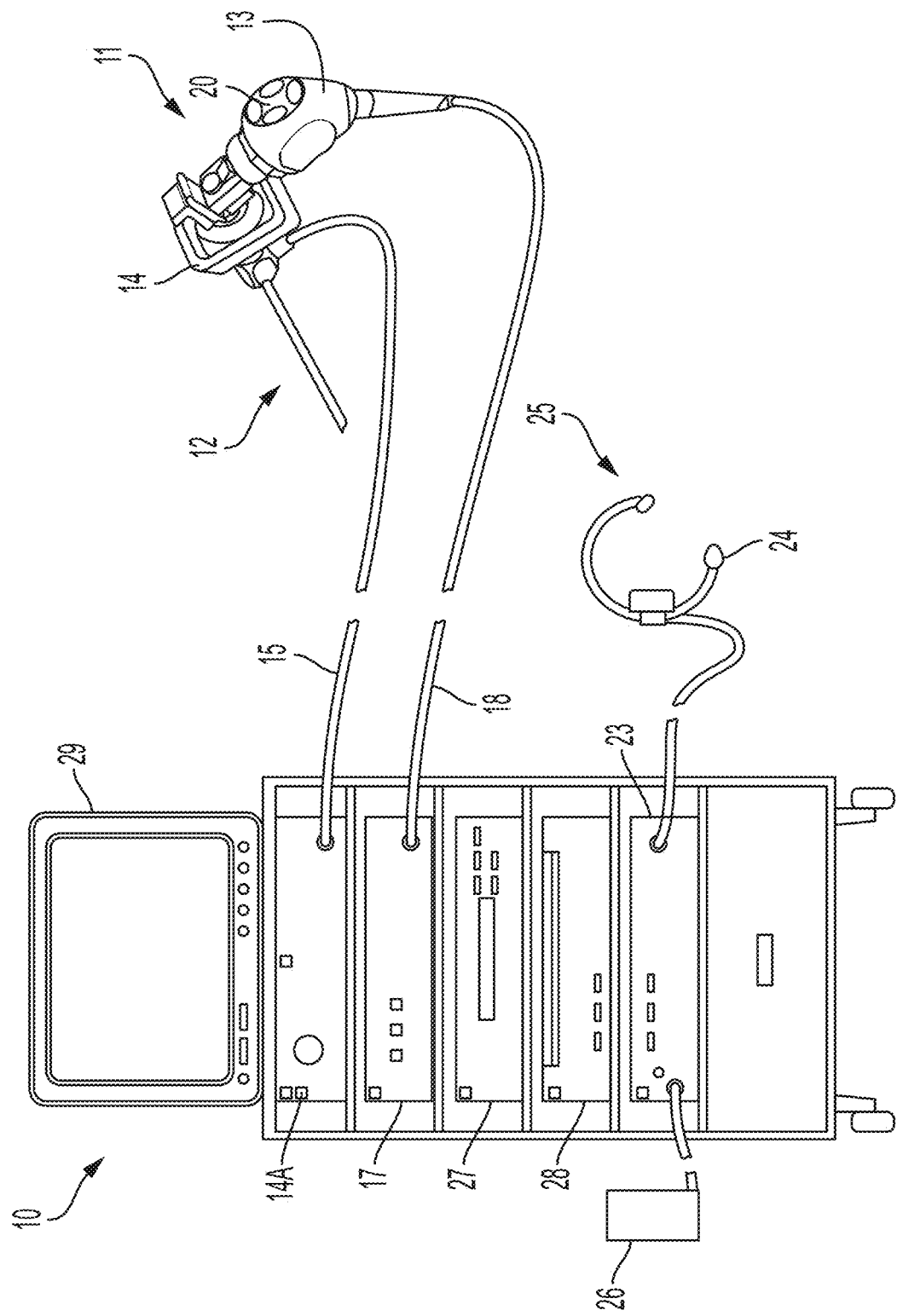
FIG. 1A shows an endoscopic camera system, according to one embodiment.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described. Described herein are devices, systems, and methods for connecting an imaging device to an imaging controller with an authenticable cable that can store information about the cable and/or the imaging device. Since conventional imaging devices typically include electronics for image sensing and user interface components, the known approach for storing information about the imaging device is to incorporate memory into the existing electronics and provide a communication channel to the imaging controller by which these memory elements can be accessed. However, this approach ignores the importance of the cable in system performance. Cables described herein according to the various exemplary embodiments provide the ability to authenticate the cable to protect against the use of potentially lower-quality replacements. Moreover, according to various embodiments, information about the imaging device can be stored on the cable instead of in the imaging device, which allows information about the cable itself to be stored and reduces the complexity of the imaging device.

According to some embodiments, a cable for connecting an imaging device to an imaging controller includes a printed circuit board assembly that is integrated into the cable. The printed circuit board can include memory for storing information about the image sensor in the camera head, the camera head assembly, and the cable itself. The circuit board includes an authentication component that allows secure storage of an encryption key and performs the operations required for encrypted communication with the camera control unit in order to allow for secure confirmation that the proper cable is being used. The circuit board can also include a microcontroller that is able to communicate with and control one or more of the other components on the circuit board.

According to some embodiments, at least the authentication component, the microcontroller, and one of the memory elements are connected to the same communication bus in order to minimize the number of wires in the cable. This same communication bus can continue to the imaging device for use by one or more components in the imaging device. The microcontroller is able to route the communication path in such a way that its own firmware can be updated if new or different functionality of the circuit board is required.

Several types of information can be stored in the electronic components on the circuit board. Calibration information for the image sensor, lifetime usage information for the camera head and cable, logs of various types of events, camera head identification information, cable identification information, and cable authentication information are some examples of the information that can be stored in the circuit board. Previously, this information was typically either not stored at all or was stored inside the camera head. The more storage capacity required in the camera head, the more complex the design of the camera head becomes. Storage in the camera head is also really only useful for camera head information itself and not for cable information because the cable is often damaged over time and then replaced in the field by third parties. The camera head and camera control unit have no way to know whether such a replacement has occurred and, therefore, may track incorrect information in many cases. Moving storage to the cable and adding authentication enforces use of compliant replacement cables and service by qualified personnel, which means information will be properly transferred and translated to replacement units.

Collecting all the information above and ensuring its accuracy has multiple benefits. It allows the camera system to indicate when periodic maintenance might be required based on actual usage data. It also allows many systems to aggregate usage data over the life of the platform, the totality of which can then be analyzed to better understand use cases, testing requirements, and quality concerns for future products. Additionally, the more information that is collected per unit, the easier it becomes to troubleshoot failures during development and testing and even in the field. Authentication capabilities further ensure a high-quality experience for end users by increasing the likelihood that only cables designed, verified, and validated to work with the camera system will be used.

In the following description of the various embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1A shows an exemplary medical imaging system 10 that can utilize an authenticable data cable for connecting a medical imaging device to a medical imaging controller, according to the principles described herein. As used herein, medical imaging includes, but is not limited to, pre-operative, intra-operative, post-operative, and diagnostic imaging sessions and procedures. System 10 includes a scope assembly 11 which may be utilized in endoscopic procedures. The scope assembly 11 incorporates an endoscope or scope 12 which is coupled to an endoscopic camera head 13 by a coupler 14 located at the distal end of the camera head 13. Light is provided to the scope by a light source 14A via a light guide 15, such as a fiber optic cable. The camera head 13 is connected to a camera control unit (CCU) 17 by an electrical cable 18. Operation of the camera 13 is controlled, in part, by the CCU 17. The cable 18 conveys still and/or video image data from the camera head 13 to the CCU 17 and conveys various control signals bi-directionally between the camera head 13 and the CCU 17. In one embodiment, the image data output by the camera head 13 is digital. The cable 18 may include a memory device for storing authentication data for authenticating the cable 18, as discussed further below.

A control or switch arrangement 20 may be provided on the camera head 13 and allows a user to manually control various functions of the system 10. These and other functions may also be controlled by voice commands using a voice-control unit 23, which is connected to the CCU 17. Optionally, voice commands are input into a microphone 24 mounted on a headset 25 worn by the surgeon and coupled to the voice-control unit 23. A hand-held control device 26, such as a tablet with a touch screen user interface or a PDA, may be connected to the voice control unit 23 as a further control interface. In the illustrated embodiment, a recorder 27 and a printer 28 are also connected to the CCU 17. Additional devices, such as an image capture and archiving device, may be included in the system 10 and connected to the CCU 17. Video image data acquired by the camera head 13 and processed by the CCU 17 is converted to images, which can be displayed on a monitor 29, recorded by recorder 27, and/or used to generate static images, hard copies of which can be produced by printer 28.

Figure 1B:
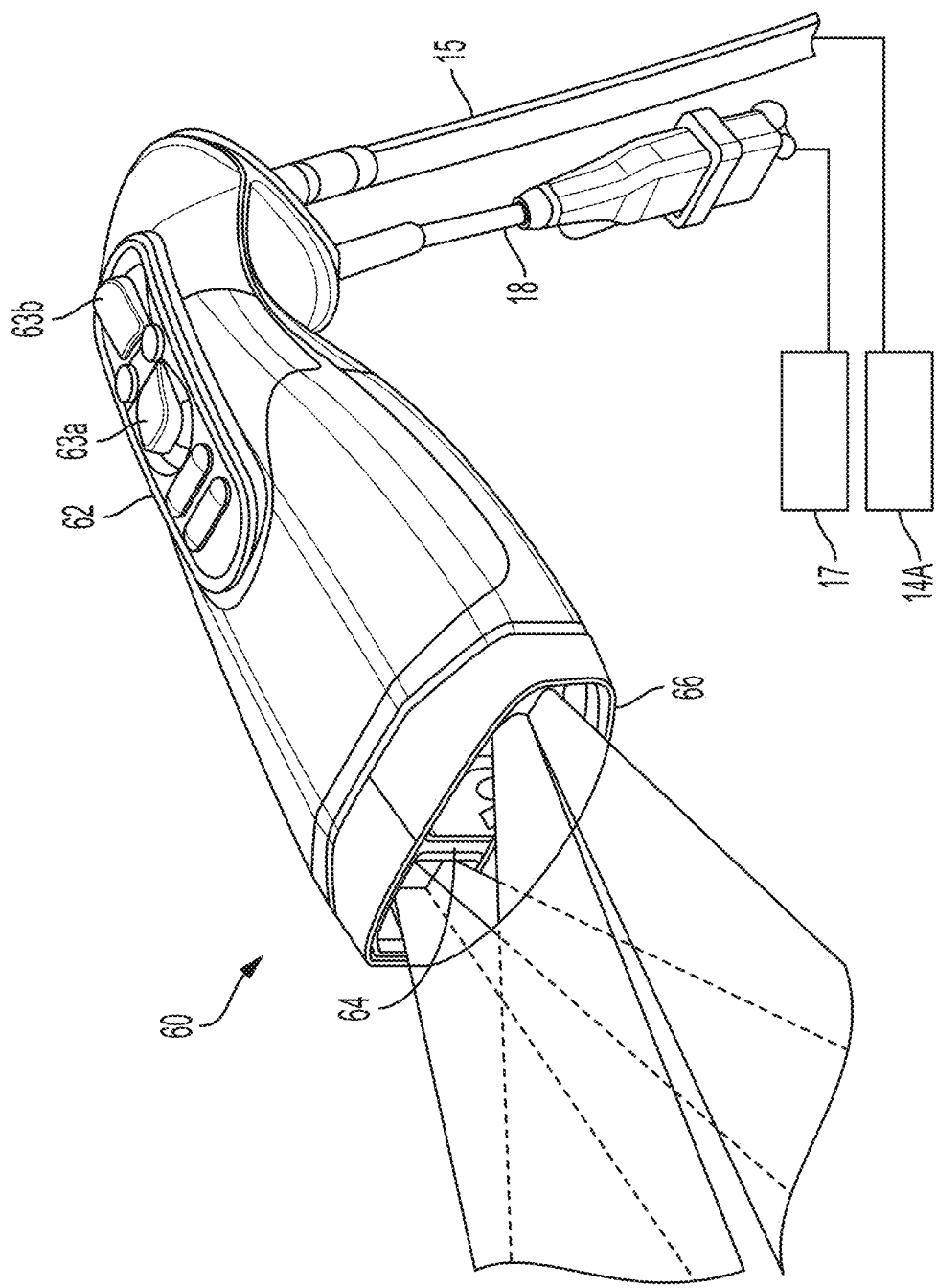
FIG. 1B shows an open-field camera system, according to one embodiment.

FIG. 1B illustrates an open-field imaging device 60, which is another example of a type of imaging device that can be connected to an imaging controller via an authenticable cable, as discussed herein. Open-field imaging device 60 can be used as part of an imaging system, such as system 10 of FIG. 1B, for various purposes, including for visualizing blood flow in vessels and related tissue perfusion during plastic, microsurgical, reconstructive, and gastrointestinal procedures. As may be seen in FIG. 1B, the open-field imaging device 60 includes a control surface 62, a window frame 64 and a nosepiece 66. The open-field imaging device 60 is connectable to the light source 14A via a light guide cable 15, through which the light is provided to the imaging field via ports in the window frame 64. The open-field imaging device 60 is connectable to the CCU 17 via an authenticable data cable 18, according to the principles described herein, which can transmit power, imaging data, and any other types of data.

The control surface 62 includes focus buttons 63a (decreasing the working distance) and 63b (increasing the working distance) that control the linkage 40. Other buttons on the control surface 62 may be programmable and may be used for various other functions, e.g., excitation laser power on/off, display mode selection, white light imaging white balance, saving a screenshot, and so forth. In some embodiments, the control surface functions can be communicated to the CCU 17 via non-imaging data communication lines in the cable 18, as discussed further below.

Figure 2A:
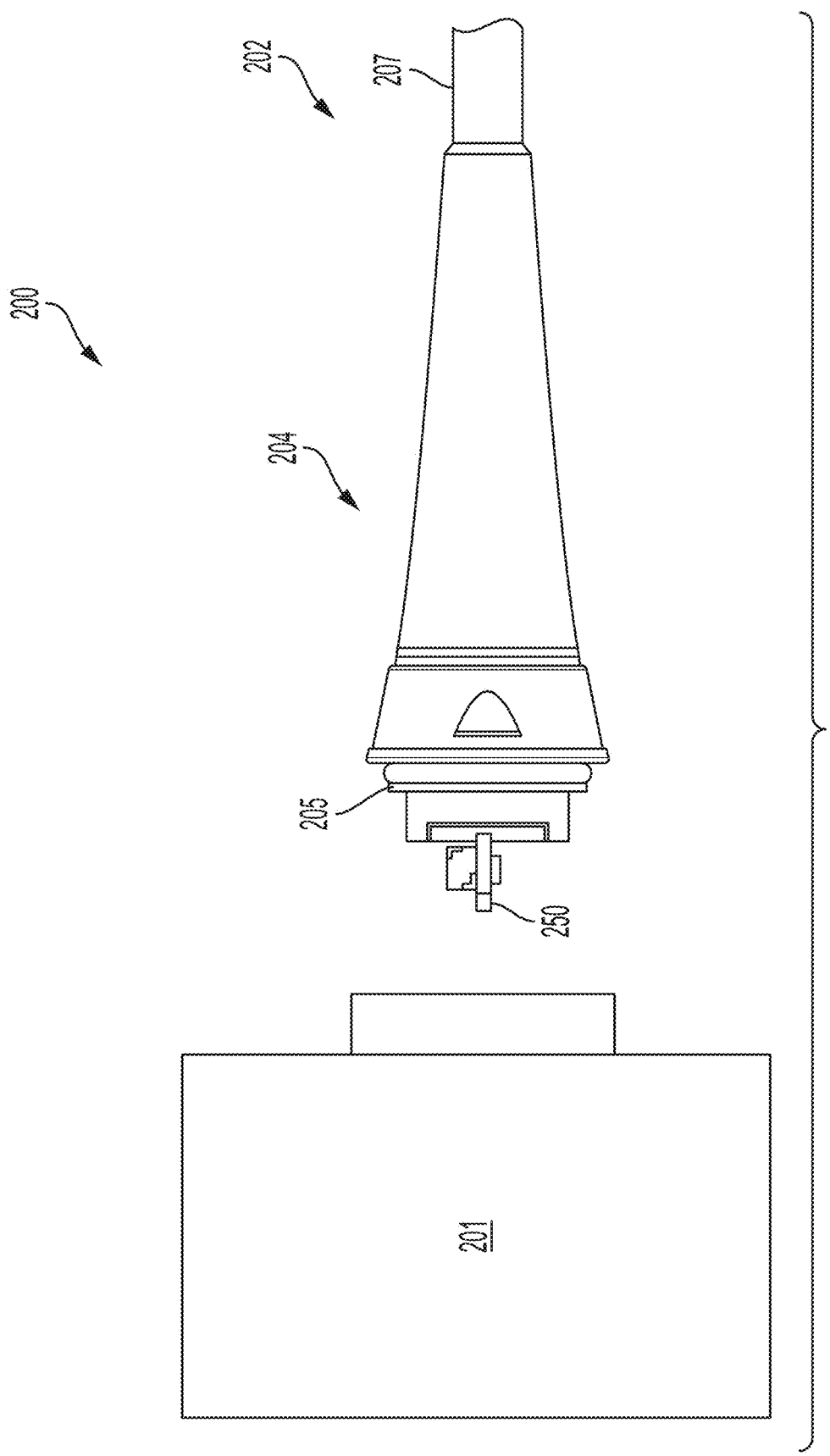
FIGS. 2A and 2B illustrates an imaging system that includes an imaging device connected to an imaging controller by a cable, according to one embodiment.
Figure 2B:
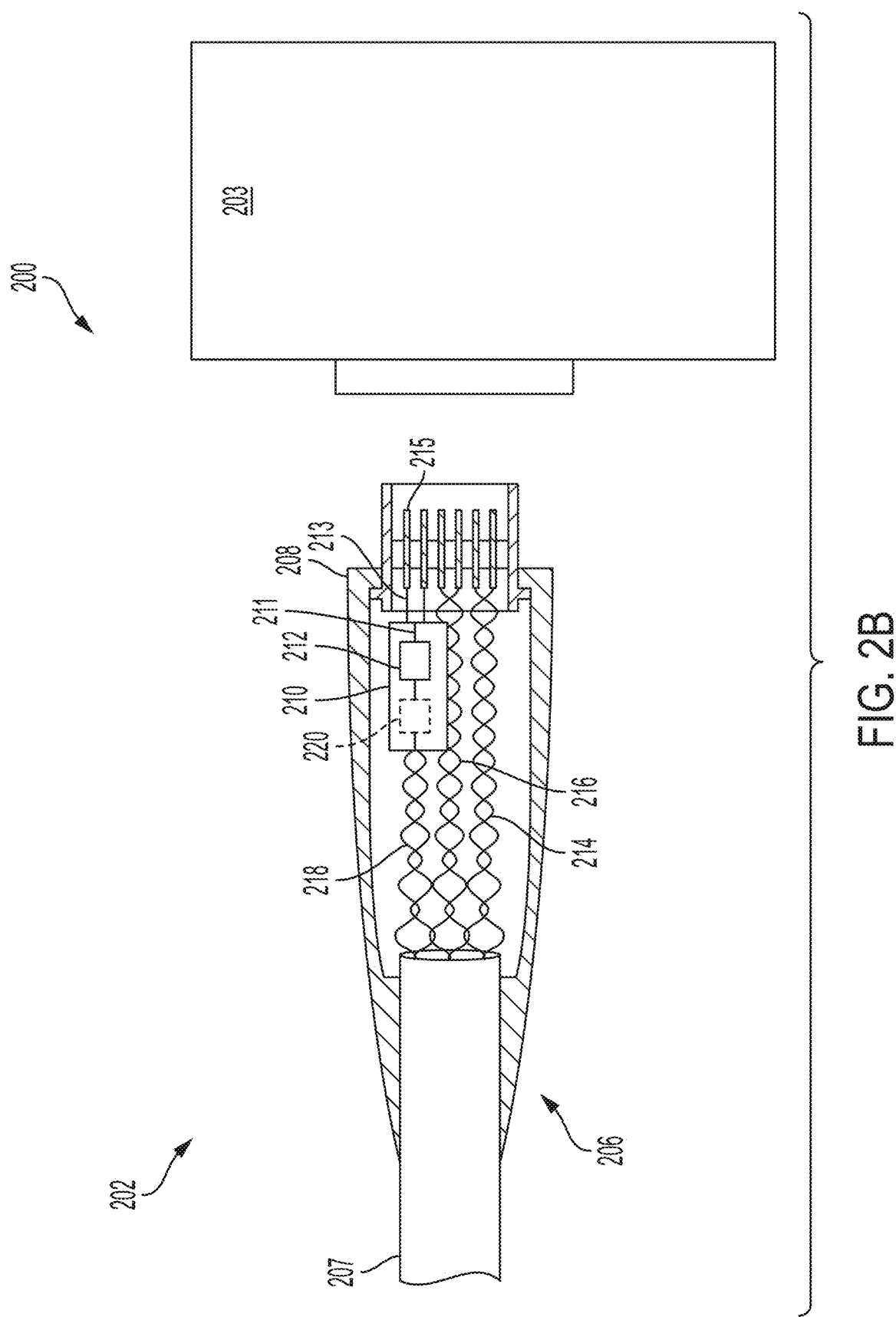

FIGS. 2A and 2B illustrate an imaging system 200 that comprises an imaging device 201, such as endoscopic camera head 13 of FIG. 1A or open-field imaging device 60 of FIG. 1B, a cable 202, and an imaging controller 203, such as CCU 17 of FIG. 1A. Cable 202 is configured for communicatively connecting the imaging device 201 to the imaging controller 203 to enable the imaging controller 203 to receive imaging data from the imaging device 201 for processing and/or display and to control one or more imaging and/or non-imaging functions of the imaging device 201. The imaging device may be a medical imaging device or a non-medical imaging device. The imaging device may be a surgical imaging device. The imaging device may be any one of an endoscope camera head, a surgical microscope camera head, or an open field medical camera head.

Cable 202 includes a distal end 204 that includes a distal end connector 205 for connecting the cable 202 to the imaging device 201. The proximal end 206 of cable 200 includes a proximal end connector 208 for connecting the cable 202 to the imaging controller 203. A cable body 207 extends between the two ends 204, 206 and houses a plurality of communication lines. As used herein a communication line is a single signal line that may be formed of a solid or stranded electrically conductive wire.

The distal end connector 205 and the proximal end connector 208 can each be any suitable connector and may include any suitable number of contacts (e.g., pins and receptacles) for connecting communication wires. Suitable connectors may include one or more locking features for preventing or discouraging an end-user from disconnecting the connector. Examples of suitable locking features are a locking lever, a locking screw, a locking toggle, a locking nut, or a locking bayonet. In some embodiments, the locking feature is configured to require a tool for unlocking. Suitable connectors may also be disconnectable connectors that enable an end-user to disconnect the connector in the field.

In some embodiments, the distal end connector 205, which is configured to connect the cable to the imaging device 201, may be configured for permanent or at least semi-permanent attachment to the imaging device 201 for preventing (or discouraging) an end-user from detaching the distal end connector 205 from the imaging device 201. The distal end connector 205 may include one or more locking features that prevent tool-less detachment of the distal end connector 205 from the imaging device. In some embodiments, the imaging device 201 and the distal end connector 205 may be permanently or semi-permanently connected at the manufacturing facility and shipped to the end user as an assembled set. In some embodiments, the distal end connector 205 includes a sealing feature, such as an O-ring or grommet, for sealing the connection to the imaging device 201. This can protect the electronics within the imaging device 201 and/or cable 202 during sterilization.

In some embodiments, the proximal end connector 208 is configured for disconnectable attachment to the imaging controller 203. As such, a user may be able to repeatedly disconnect the proximal end connector 208, such as by hand. Once disconnected, the imaging device 201 and attached cable 202 can be cleaned, sterilized, stored, used with a different imaging controller, repaired, or otherwise disposed of separately from the imaging controller 203.

Cable 202 includes one or more imaging communication lines 214 for communicating imaging data (e.g., pixel and/or voxel data) from the imaging device 201 to the imaging controller 203. The imaging communication lines 214 may be configured for high speed transmission of imaging data, such as video data, from the imaging sensor in the imaging device to the imaging data processor in the imaging controller. Cable 202 may include one or more imaging control communication lines 216 that enable control communications to be exchanged between the imaging device 201 and the imaging controller 203. The communication lines, including the imaging communication lines 214 and the imaging control lines 216, may be any suitable data communication lines of any suitable number.

Cable 202 includes a printed circuit board (PCB) 210 that includes at least one memory 212 that stores information for retrieval by an imaging device controller via a communication bus 211 on the PCB 210. The at least one memory 212 may store authentication data for enabling a connected imaging controller 203 to authenticate the cable so that, upon connection of the cable to the imaging controller 203, the imaging controller 203 can access the information on the at least one memory 212 and verify that the cable is an authentic cable. This capability can help ensure the use of a cable with the capabilities and quality intended for connecting the imaging device to the imaging controller. By providing the ability to authenticate the cable, the system may discourage end users or third-party servicers from substituting inferior or unauthorized third-party cables, which can enhance performance of the imaging system.

The at least one memory 212 may store other information in addition to authentication information for access by imaging controller 203. Data stored can include cable related information, such as cable type, cable identity, and cable use count, and/or can include device information, including imaging device type, imaging device identity, imaging device usage count, imaging device settings, imager calibration parameters, imager pixel compensation information, imaging device run time, imaging device button operation count, or any other useful information. The ability to authenticate the cable can enable an imaging system to trust the other information stored in the PCB.

In the illustrated embodiment, the PCB 210 is located in the proximal end 206 of the cable 200. In other embodiments, the PCB 210 is located in another part of the cable 200, such as in the distal end 202 or between the proximal and distal ends. In the illustrated embodiment, the PCB 210 is communicatively connected to the proximal end connector 208, such as through one or more wires 213 that are connected to pins or receptacles 215 of the proximal end connector 208. The PCB 210 may be a single PCB or multiple PCBs.

The PCB 210 may be integrally formed in one or more of the ends of the cable. For example, the PCB may be connected to the proximal end connector 208 and any non-communication wiring and may then be overmolded.

Integrating the PCB 210 in this way can ensure that the PCB is hermetically sealed within the cable, which can be important for cables that need sterilization, and can help prevent an end-user or third-party from removing the PCB 210 and installing the PCB 210 in a third-party cable in an attempt to bypass the security features provided by the cable.

In some embodiments, the cable 202 includes one or more auxiliary communication lines 218 for communicating at least non-imaging data between the imaging controller 203 and the imaging device 201. The imaging device 201 may include one or more non-imaging components, such as switch arrangement 20 of system 10, and the auxiliary communication lines 218 may communicatively connect the non-imaging components to the imaging controller 203. Examples of non-imaging components include memory, user interface components, such as buttons and switches, sensors, such as accelerometers and gyroscopes, displays, and controllers for controlling the non-imaging components. In some embodiments, imaging and/or imaging control data is transmitted via one or more of the auxiliary communication lines 218.

In some embodiments, the one or more auxiliary communication lines 218 are connected to the PCB 210 such that communications on the auxiliary communication lines 218 pass through the PCB 210. In other embodiments, the one or more auxiliary communication lines 218 run directly to the proximal end connector 208, bypassing the PCB 210. In some embodiments, a portion of auxiliary communication lines connect to the PCB 210 and a portion of auxiliary communication lines bypass the PCB 210. In some embodiments, at least one of the imaging communication lines 214 and/or at least one of the auxiliary communication lines 218 connects through the PCB 210. In some embodiments, at least one of the imaging communication lines 214 connects through the PCB 210 but bypasses the communication bus 211 of the PCB 210.

In some embodiments, at least one of the imaging communication lines 214 bypasses the PCB 210. In some embodiments, at least one of the imaging control communication lines 216 bypasses the PCB 210. In the embodiment illustrated in FIGS. 2A and 2B, all of the imaging and imaging control communication lines 214, 216 bypass the PCB 210. In some embodiments, at least one of the imaging communication lines 214 and/or at least one of the imaging control communication lines 216 connect through the PCB 210 but bypass the communication bus 211 of the PCB 210.

According to some embodiments, the PCB 210 is communicatively connected to the proximal end connector 208 for enabling access to the authentication information by an imaging controller connected to the proximal end connector 208, and the one or more imaging communication lines 214 extend from the distal end connector 205 to the proximal end connector 208 for communicating imaging data from an imaging device connected to the distal end connector 205 to an imaging controller connected to the proximal end connector 208, and the one or more imaging communication lines 214 bypass the PCB 210. In some of these embodiments, the imaging control communication lines 216 also bypass the PCB 210.

PCB 210 may include one or more components 220 in addition to memory 212. Examples of additional components include additional memory, one or more processors, one or more microcontrollers, and one or more integrated circuits. In some embodiments, the memory 212 is a component of an authentication chip that is configured for communicating with the imaging controller 203 for authentication of the cable. The authentication chip may include one or more processors and one or more memory for facilitating authentication of the cable by the imaging controller. Memory 212 may include multiple discrete memories, including multiple types of memories, that may include separate memory components on the PCB 210 and/or separate memory units incorporated in separate components on the PCB 210. For example, memory 212 may include any suitable number and/or combination of flash memories, ROMs, PROMs, EEPROMs, and RAMs.

In some embodiments, PCB 210 may include an additional PCB 250 that may be located at an end of the cable, such as distal end 204, for interfacing with one or more components of a connected imaging device. For example, the PCB 250 may be configured for mounting connectors of one or more control boards of the imaging device and for providing a large ground pad to tie the cable shielding ground with the signal ground of the imaging device.

Figure 3:
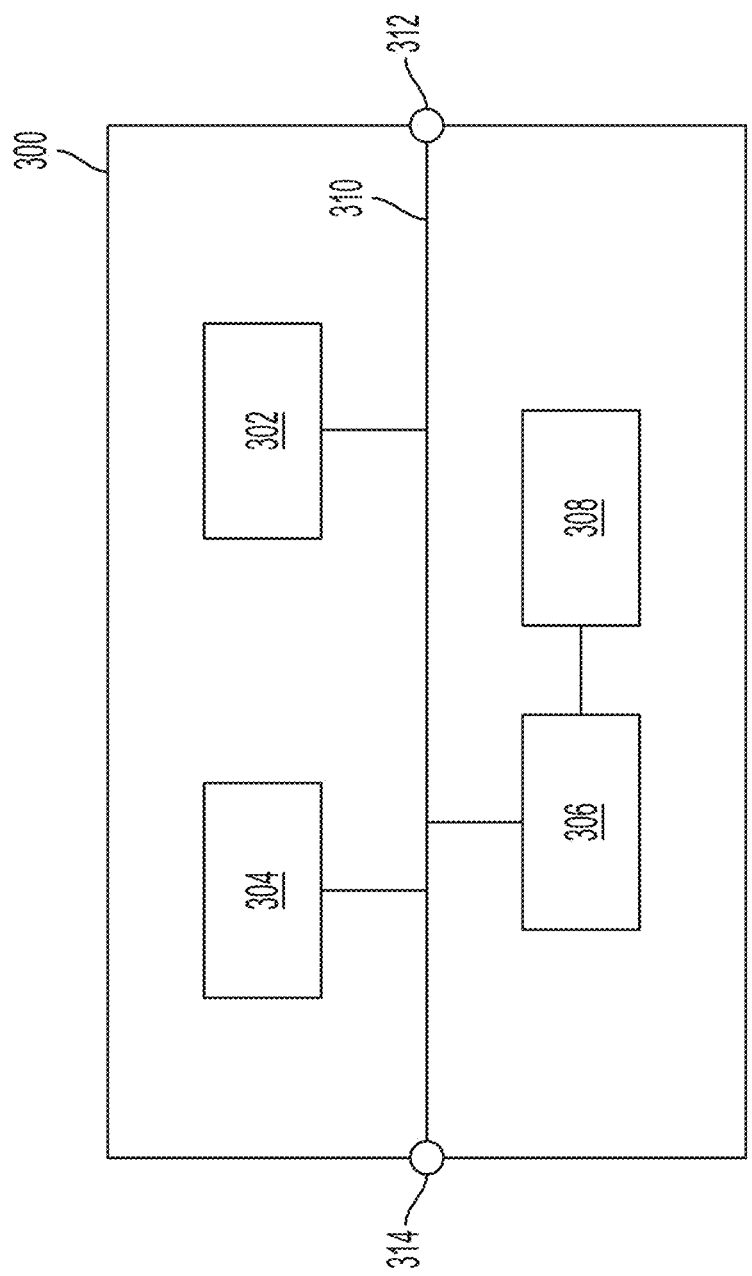
FIG. 3 is a block diagram of a printed circuit board for an imaging device to imaging controller connecting cable, according to one embodiment.

FIG. 3 is a block diagram of a PCB 300, according to one embodiment, for integrating into a cable as discussed above. PCB 300 includes authentication chip 302, EEPROM 304, microcontroller 306, and flash memory 308. PCB 300 includes a communication bus 310 that is connectable to one or more pins (or receptacles) of a proximal end connector, such as proximal end connector 208 of FIGS. 2A and 2B, via one or more connections 312. In some embodiments, the communication bus 310 includes a clock line and a signal line. One or more of the components on the PCB 300 may be connected to the communication bus 310. In the illustrated embodiment, the authentication chip 302, EEPROM 304, and microcontroller 306 are directly connected to the communication bus 310, while the flash memory is connected only to the microcontroller 306.

In some embodiments, the communication bus 310 is connectable to one or more auxiliary communication lines, such as auxiliary communication lines 218 of FIGS. 2A and 2B, via one or more connections 314. The imaging controller can communicate with the non-imaging components on the imaging device using the same communication lines as it uses to communicate with components on the PCB 300. This allows for the reduction of the amount of wiring and connections (e.g., pins and/or receptacles), which can be beneficial for reducing points of failure, decreasing cost, and/or reducing sterilization complexity.

The authentication chip 302 is configured to store authentication information and to communicate with an imaging controller for the imaging controller to authenticate the authentication chip 302, and thereby, the cable. The authentication chip 302 allows secure storage of an encryption key and performs the operations required for encrypted communication with the imaging controller in order to allow secure confirmation that the proper cable is being used.

The EEPROM 304 can be used for storage of information about cable and/or information about the imaging device. Exemplary information includes cable and imaging device serial numbers, cable and imaging device types, cable and imaging device usage statistics (e.g., number of times used, time of use), imaging device component usage (e.g., number of button presses). In some embodiments, a cable and imaging device are assembled at the manufacturer and provided to the end-user as a matched set. Imaging device data, such as any of the information above, can be preloaded onto the EEPROM 304 before delivery to the end-user. Thus, these types of information can be stored in the cable rather than (or in addition to) in the camera head. In some embodiments, the information stored in the EEPROM 304 may be updated by a connected imaging controller. For example, cable and imaging device usage counts can be incremented by the imaging controller each time the imaging device is used. Further, non-imaging component usage, such as data indicating a button press, may be transmitted to the imaging controller, such as via the PCB 300 or via a communication line bypassing the PCB 300, and the imaging controller may update data in the EEPROM 304 accordingly. In some embodiments, the imaging device can write directly to the EEPROM 304 (or other memory on the PCB 300) without involvement of the imaging controller.

According to some embodiments, the microcontroller 306 can control one or more of the components on the PCB 300. The microcontroller 306 may control read/write access over the communication bus 310 to one or more of the components. For example, a command may be received from the imaging controller for the microcontroller to enable one or more of the components on the PCB 300 to communicate with the imaging controller and the microcontroller may respond accordingly. The microcontroller may also be capable of routing the communication path in such a way that its own firmware can be updated if new or different functionality of the PCB 300 is required.

In some embodiments, the microcontroller 306 serves as a translator for communications of one or more components that are not directly connected to the communication bus 310, such as flash memory 308. This may be beneficial where, for example, the shared communication bus 310 is incompatible with the one or more components, such as when the one or more components require more communication lines than provided by the communication bus 310. The microcontroller can translate communications received on the communication bus 310 to commands sent on one or more communication lines to the one or more components. This can reduce the number of communication lines that need to be connected to the imaging controller, reducing complexity and cost. For example, the communication bus 310 may be a two wire bus and the flash memory may be configured for four wire communication. The microcontroller can translate from two line commands to four line commands so that not all four lines need to be provided to the proximal end connector.

According to some embodiments, flash memory 308 can be used for storing imaging related information for the imaging device, such as imager calibration parameters and imager pixel compensation information.

Figure 4:
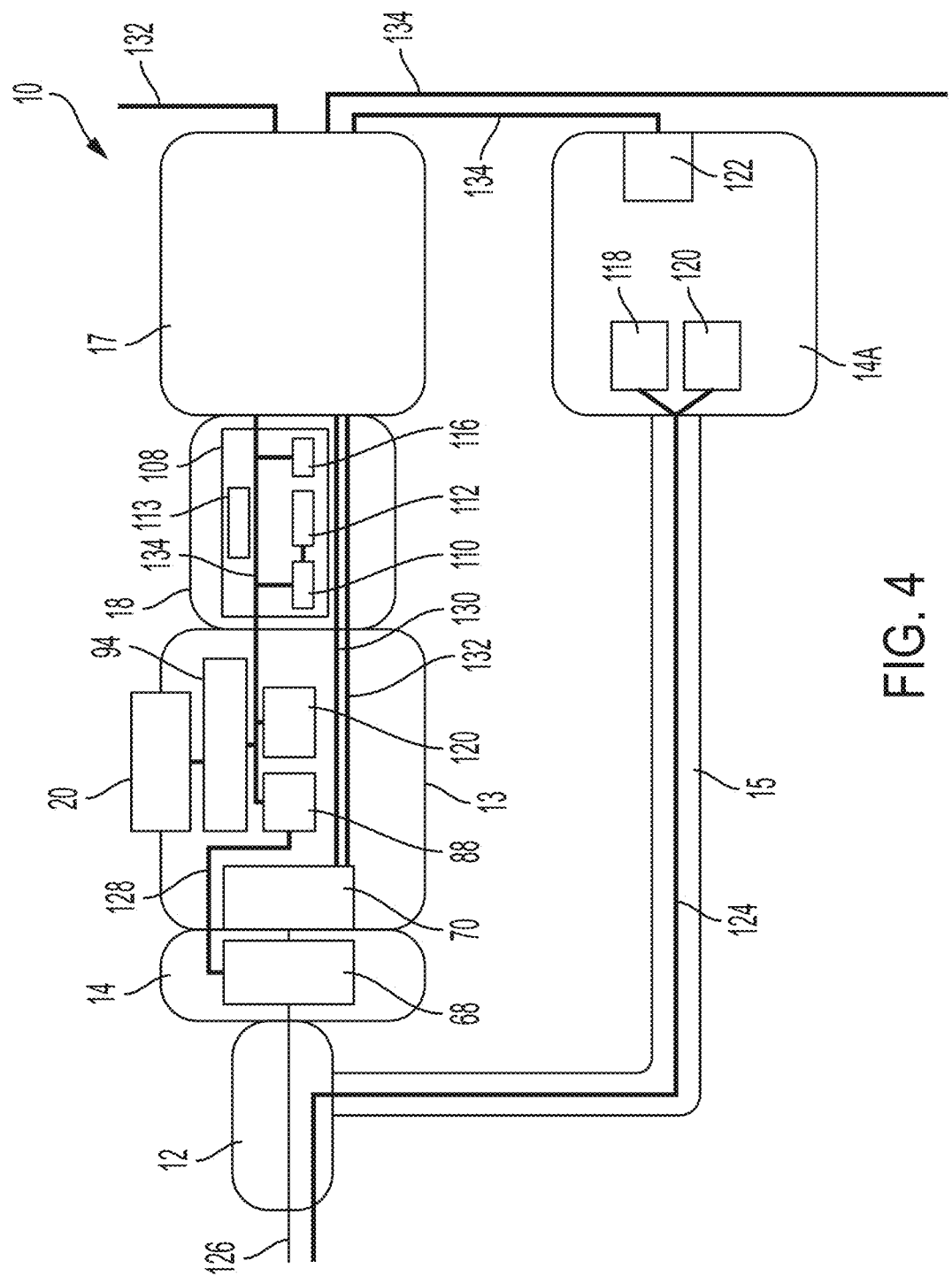
FIG. 4 is a block diagram of an imaging system showing pathways of light and signals throughout the system, according to one embodiment.

FIG. 4 depicts pathways of light and signals throughout the camera system 10 of FIG. 1A, according to some embodiments. In operation, light is projected from the light source 14A through the light guide 15 to the scope 12. The light may be from a visible light source 118 or from a light source 120 in the invisible spectrum. The light source 14A also includes serial communication ports 122 to allow communication with the CCU 17 via a non-imaging control signal line 134. The CCU 17 communicates with the light source 14A to adjust the light source and the outgoing light 124 as needed.

Outgoing light 124 from the light source 14A travels through the light guide 15 to and through the scope 12, and to the target site. In turn, an incoming image or light 126 travels through the scope 12, into and through the relay lens assembly 68 in the coupler 14 and into the camera sensor unit 70. The relay lens 68 may be controlled by a lens driver 88 (if applicable) which sends a control signal 128 to the relay lens 68 from the camera head 13.

Use of the camera can be controlled by the control/switch arrangement 20 in conjunction with the button board 94, which is in communication with the lens driver 88 and an accelerometer/gyroscope 120. The sensor unit 70 communicates with the CCU 17 via one or more imaging control communication lines 130. High speed digital video is communicated from the sensor unit 70 to the CCU 17 via one or more imaging communication lines 132. The imaging and imaging control communication lines 130, 132 extend through the cable 18 to the CCU 17.

Various components of the camera head 13 can communicate with the printed circuit board 108 in the cable 18 and through the circuit board 108 to the CCU 17. As discussed above, the circuit board may include multiple components, including but not limited to a microcontroller 110, a flash memory 112, an authentication chip 113, and an EEPROM 116. The communication from or to the camera head components, such as the lens driver 88 and the button board 94, are transmitted in the cable 18 by a one or more auxiliary communication lines 134.

Once the high speed digital video 132 reaches the CCU 17, the CCU 17 can process the video as needed and forward the processed video to a display via a highspeed digital video signal 132.

Such a system with a printed circuit board, including memory, in the camera cable 18 provides a much more useful and safe system which can, among other things, authenticate the cable and identify the type of camera head attached so that the CCU can perform the various functions and run various algorithms as needed.

Figure 5:
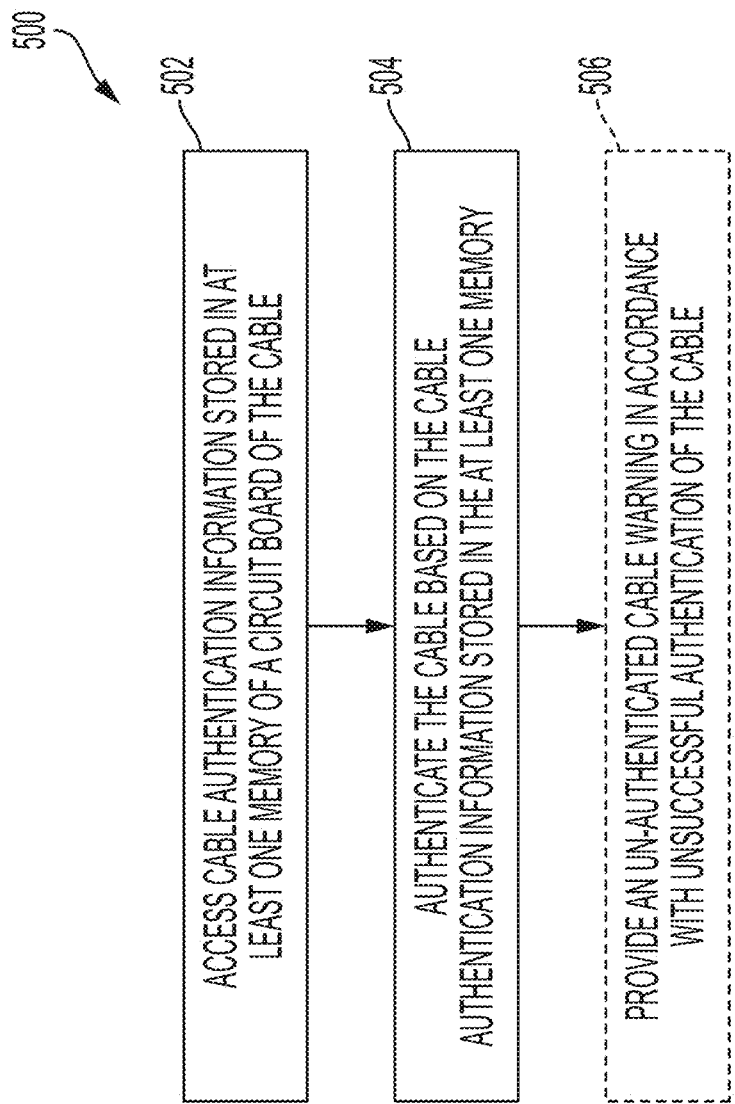
FIG. 5 is a block diagram of a method of authenticating a cable connecting an imaging device to an imaging controller, according to one embodiment.

FIG. 5 illustrates a method 500 of authenticating a cable, such as cable 202 of FIGS. 2A and 2B, according to some embodiments. Method 500 may be performed by an imaging controller, such as imaging controller 203, that is connected to a imaging device, such as imaging device 201, by the cable. The imaging controller may include one or more processors, memory, and one or more programs stored in the memory for execution by the one or more processors and including instructions for performing steps detailed below. In some embodiments, the imaging device is a medical imaging device, such as a surgical endoscope camera, a surgical microscope camera, or an open-field handheld imager.

At step 502 the imaging controller accesses cable authentication information stored in at least one memory of a circuit board of the cable. Upon connection of the cable to the imaging controller, the imaging controller may provide power to the circuit board and may initiate communication with, for example, an authentication chip (such as authentication chip 302 of FIG. 3) for exchanging authentication information (e.g., one or more cryptographic keys), according to well-known methods.

At step 504, the cable is authenticated based on the cable authentication information stored in the at least one memory of the cable. The imaging controller verifies the authentication information in the memory.

In some embodiments, at step 506, the imaging controller may provide an un-authenticated cable warning in accordance with unsuccessful authentication of the cable. This warning may be provided as a display on a display of the imaging controller and/or a display connected to the display of the imaging controller. The warning may additionally or alternatively be provided as an audible warning, such as a buzzer or siren or an automated audible message. In some embodiments, the imaging controller may disable one or more normal operating functions, for example, to discourage the use of unauthorized cables. In some embodiments, the imaging controller may disable operation altogether.

In some embodiments, the imaging controller may access information associated with the imaging device that is stored in the at least one memory and may control the imaging device and/or process imaging data from the imaging device based on the imaging device identification information. For example, the imaging controller may control frame rates, shutter parameters, gains, lens position, or any other suitable parameter of the imaging device, according to the imaging device information. The imaging controller may crop and/or zoom imaging data or otherwise process imaging data received from the imaging device based on, for example, an imaging device type or imaging device parameters (calibration parameters, pixel compensation parameters, etc.).

In some embodiments, the imaging controller may communicate with one or more processors of the circuit board to retrieve one or more imaging device calibration parameters stored in the at least one memory. For example, the imaging controller may communicate with a microcontroller to obtain pixel compensation data stored in a memory, as discussed above with respect to microcontroller 306 and flash memory 308. The imaging controller may process imaging data received from the imaging device according to the calibration and/or pixel compensation data, according to well-known methods.

In some embodiments, the imaging controller may write information to one or more memories of the circuit board. For example, the imaging controller may update a cable use counter in the memory, update an imaging device use counter in the memory, may update an imaging device run time counter in the memory, or may update an imaging device button operation count. In some embodiments, a cable associated with an imaging device may be replaced and information related to the imaging device stored in the circuit board may be transferred to the replacement cable. This allows for tracking of information for an imaging device and its associated cable across the respective lifetimes of the imaging device and cable, which is an improvement over known systems that completely ignore the importance of the cable to the imaging system.

In some embodiments, the imaging controller may communicate with one or more non-imaging components in the imaging device via a communication bus on the circuit board. For example, the imaging controller may send commands to a lens assembly controller in the imaging device for controlling focus and/or zooming or may receive button press indications from a button control board in the imaging device and/or sensor signals from the imaging device via the communication bus of the circuit board. In some embodiments, the imaging controller may write information to one or more components on the circuit board based on information received from one or more components on the imaging device. For example, the imaging controller may increment a button press counter in memory on the circuit board each time the associated button on the imaging device is actuated.

In some embodiments, the imaging controller may receive imaging data from the imaging device via one or more imaging communication lines in the cable that bypass at least the communication bus of the circuit board (or bypass the circuit board altogether). Since the imaging data may be data intensive, bypassing the circuit board can reduce latency and signal to noise ratio for the imaging data and otherwise improve imaging data transmission performance.

Example System for Use in Generating Imaging Data

Figure 6:
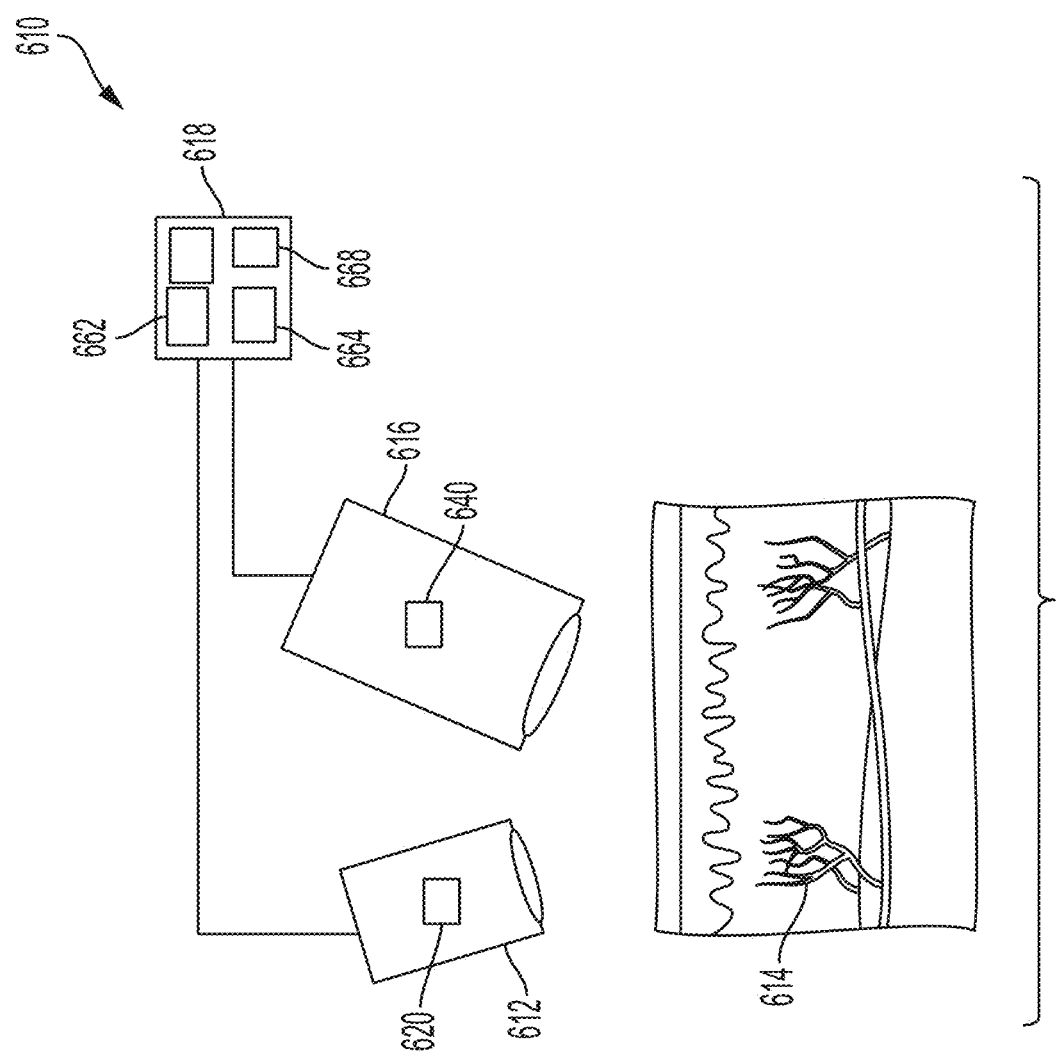
FIG. 6 is an illustrative depiction of an exemplary fluorescence imaging system, according to some embodiments.

A system for collecting medical imaging data, such as system 10 of FIG. 1A, may include one or more imaging systems for acquiring a time series of images of tissue (e.g., a time series of fluorescence images, a time series of white light images, etc.). In some embodiments, an imaging system is a fluorescence imaging system. FIG. 6 is a schematic example of a fluorescence imaging system 610, according to one embodiment. The fluorescence imaging system 610 comprises a light source 612 to illuminate the tissue of the subject to induce fluorescence emission from a fluorescence imaging agent 614 in the tissue of the subject (e.g., in blood, in urine, in lymph fluid, in spinal fluid or other body fluids or tissues), an image acquisition assembly 616 arranged for generating the time series and/or the subject time series of fluorescence images from the fluorescence emission, and a processor assembly 618 arranged for processing the generated time series/subject time series of fluorescence images. The processor assembly 618 may include memory 668 with instructions thereon, a processor module 662 arranged for executing the instructions on memory 668 to process the time series and/or subject time series of fluorescence images, and a data storage module 664 to store the unprocessed and/or processed time series and/or subject time series of fluorescence images. In some variations, the memory 668 and data storage module 664 may be embodied in the same storage medium, while in other variations the memory 668 and the data storage module 664 may be embodied in different storage mediums. The system 610 may further include a communication module 666 for transmitting images and other data, such as some or all of the time series/subject time series of fluorescence images or other input data, spatial maps, subject spatial maps, and/or a tissue numerical value (quantifier), to an imaging data processing hub.

Figure 7:
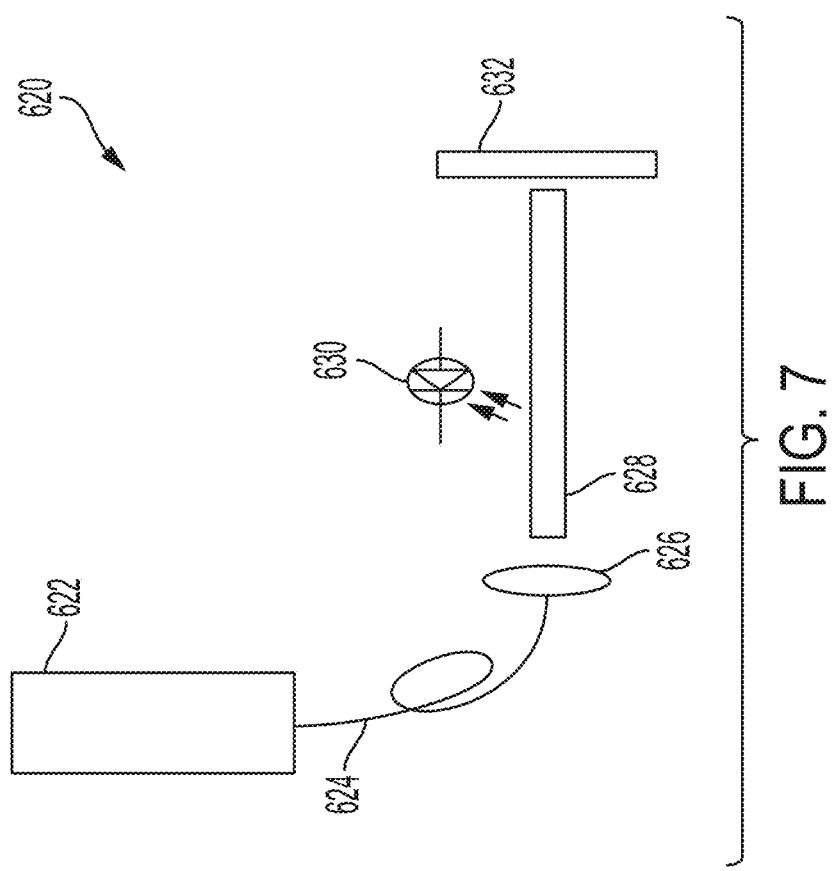
FIG. 7 is an illustrative depiction of an exemplary illumination module of a fluorescence imaging system, according to some embodiments.

In some variations, the light source 612 includes, for example, an illumination module 620. Illumination module 620 may include a fluorescence excitation source arranged for generating an excitation light having a suitable intensity and a suitable wavelength for exciting the fluorescence imaging agent 614. As shown in FIG. 7, the illumination module 620 may comprise a laser diode 622 (e.g., which may comprise, for example, one or more fiber-coupled diode lasers) arranged for providing an excitation light to excite the fluorescence imaging agent (not shown) in tissue of the subject. Examples of other sources of the excitation light which may be used in various embodiments include one or more LEDs, arc lamps, or other illuminant technologies of sufficient intensity and appropriate wavelength to excite the fluorescence imaging agent in the tissue. For example, excitation of the fluorescence imaging agent in blood, wherein the fluorescence imaging agent is a fluorescence dye with near infra-red excitation and emission characteristics, may be performed using one or more 793 nm, conduction-cooled, single bar, fiber-coupled laser diode modules from DILAS Diode Laser Co, Germany.

In some variations, the light output from the light source 612 may be projected through one or more optical elements to shape and guide the output being used to illuminate the tissue area of interest. The optical elements may include one or more lenses, light guides, and/or diffractive elements so as to ensure a flat field over substantially the entire field of view of the image acquisition assembly 616. The fluorescence excitation source may be selected to emit at a wavelength close to the absorption maximum of the fluorescence imaging agent 614 (e.g., indocyanine green (ICG), etc.). For example, as shown in FIG. 7, the output 624 from the laser diode 622 may be passed through one or more focusing lenses 626, and then through a homogenizing light pipe 628 such as, for example, light pipes commonly available from Newport Corporation, USA. Finally, the light may be passed through an optical diffractive element 632 (i.e., one or more optical diffusers) such as, for example, ground glass diffractive elements also available from Newport Corporation, USA. Power to the laser diode 622 may be provided by, for example, a high-current laser driver such as those available from Lumina Power Inc. USA. The laser may optionally be operated in a pulsed mode during the image acquisition process. An optical sensor such as a solid state photodiode 630 may be incorporated into the illumination module 620 and may sample the illumination intensity produced by the illumination module 620 via scattered or diffuse reflections from the various optical elements. In some variations, additional illumination sources may be used to provide guidance when aligning and positioning the module over the area of interest.

Figure 8:
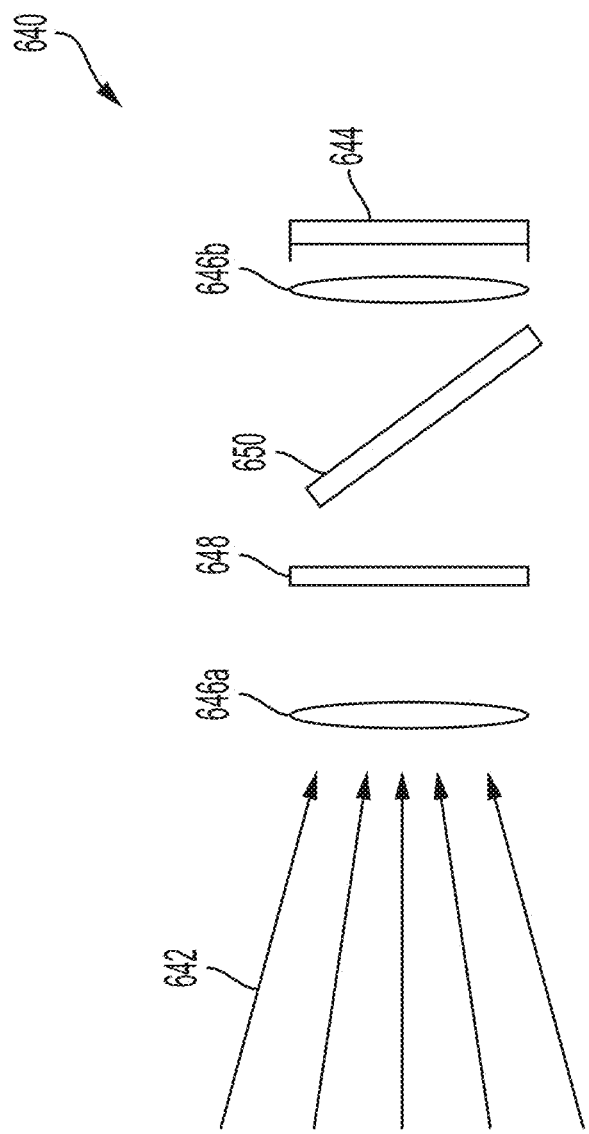
FIG. 8 is an exemplary camera module of a fluorescence imaging system, according to some embodiments.

Referring again to FIG. 6, in some variations, the image acquisition assembly 616 may be a component of a fluorescence imaging system 610 configured to acquire the time series and/or subject time series of fluorescence images from the fluorescence emission from the fluorescence imaging agent 614. The image acquisition assembly 616 may include a camera module 640, which may include an imaging device, such as endoscopic camera 13 of FIG. 1A, open-field imaging device 60 of FIG. 1B, and imaging device 201 of FIGS. 2A and 2B, connected to an imaging controller, such as imaging controller 203, via an authenticable cable with memory, such as cable 202. As shown in FIG. 8, the camera module 640 may acquire images of the fluorescence emission 642 from the fluorescence imaging agent in the tissue by using a system of imaging optics (e.g., 646a, 646b, 648 and 650) to collect and focus the fluorescence emission onto an image sensor assembly 644. The image sensor assembly 644 may comprise at least one 2D solid state image sensor. The solid state image sensor may be a charge coupled device (CCD), a CMOS sensor, a CID or similar 2D sensor technology. The charge that results from the optical signal transduced by the image sensor assembly 644 is converted to an electrical video signal, which includes both digital and analog video signals, by the appropriate read-out and amplification electronics in the camera module 640.

According to an exemplary variation of a fluorescent imaging system, the light source may provide an excitation wavelength of about 800 nm +/−10 nm, and the image acquisition assembly uses emission wavelengths of >820 nm with NIR-compatible optics for, for example, ICG fluorescence imaging. In an exemplary embodiment, the NIR-compatible optics may include a CCD monochrome image sensor having a GigE standard interface and a lens that is compatible with the sensor with respect to optical format and mount format (e.g., C/CS mount).

In some variations, the processor module 662 comprises any computer or computing means such as, for example, a tablet, laptop, desktop, networked computer, or dedicated standalone microprocessor. For instance, the processor module 662 may include one or more central processing units (CPU). In an exemplary embodiment, the processor module 662 is a quad-core, 2.5 GHz processor with four CPUs where each CPU is a microprocessor such as a 64-bit microprocessor (e.g., marketed as INTEL Core i3, i5, or i7, or in the AMD Core FX series). However, in other embodiments, the processor module 662 may be any suitable processor with any suitable number of CPUs and/or other suitable clock speed.

Inputs for the processor module 662 may be taken, for example, from the image sensor 644 of the camera module 640 shown in FIG. 8, from the solid state photodiode 630 in the illumination module 620 in FIG. 7, and/or from any external control hardware such as a footswitch or remote-control. Output is provided to the laser diode driver and optical alignment aids. As shown in FIG. 6, in some variations, the processor assembly 618 may have a data storage module 664 with the capability to save the time series/subject time series of images, or data representative thereof, or other input data to a tangible non-transitory computer readable medium such as, for example, internal memory (e.g. a hard disk or flash memory), so as to enable recording and processing of acquired data. In some variations, the processor module 662 may have an internal clock to enable control of the various elements and ensure correct timing of illumination and sensor shutters. In some variations, the processor module 662 may also provide user input and graphical display of outputs. The fluorescence imaging system may optionally be configured with a communication unit 666, such as a wired or wireless network connection or video output connection for transmitting the time series of fluorescence images as they are being acquired or played back after recording. The communication unit 666 may additionally or alternatively transmit processed data, such as a spatial map, a subject spatial map, and/or tissue numerical value.

In operation of the exemplary system described in FIGS. 6-8, the subject is positioned relative to fluorescence imaging system 610 such that an area of interest (e.g., target tissue region) is located beneath the light source 612 and the image acquisition assembly 616 such that the illumination module 620 of light source 612 produces a substantially uniform field of illumination across substantially the entire area of interest. In some variations, prior to the administration of the fluorescence imaging agent 614 to the subject, an image may be acquired of the area of interest for the purposes of background deduction. To acquire fluorescence images/subject fluorescence images, the operator of the fluorescence imaging system 610 may initiate the acquisition of the time series/subject time series of fluorescence images by depressing a remote switch or foot-control, or via a keyboard (not shown) connected to the processor assembly 618. As a result, the light source 612 is turned on and the processor assembly 618 begins recording the fluorescence image data/subject fluorescence image data provided by the image acquisition assembly 616. When operating in the pulsed mode of the embodiment, the image sensor 644 in the camera module 640 is synchronized to collect fluorescence emission following the laser pulse produced by the diode laser 622 in the illumination module 620. In this way, maximum fluorescence emission intensity is recorded, and signal-to-noise ratio is optimized. In this embodiment, the fluorescence imaging agent 614 is administered to the subject and delivered to the area of interest via arterial flow. Acquisition of the time series/subject time series of fluorescence images is initiated, for example, shortly after administration of the fluorescence imaging agent 614, and the time series of fluorescence images from substantially the entire area of interest is acquired throughout the ingress of the fluorescence imaging agent 614. The fluorescence emission from the region of interest is collected by the collection optics of the camera module 640. Residual ambient and reflected excitation light is attenuated by subsequent optical elements (e.g., optical element 650 in FIG. 8 which may be a filter) in the camera module 640 so that the fluorescence emission can be acquired by the image sensor assembly 644 with minimal interference by light from other sources.

In some variations, following the acquisition or generation of the time series/subject time series of fluorescence images, the processor assembly 618 (e.g., processor module 662 or other processor) may then be initiated to execute instructions stored on memory 668 and process the imaging data before transmission to the imaging data processing system. The system 610 may transmit, via connection 666, the spatial map/subject spatial map and/or any clinical correlations or diagnosis derived therefrom or both for display to the user in a composite display feed as, for example, a grayscale or false color image, and/or stored for subsequent use.

A tangible non-transitory computer readable medium having computer-executable (readable) program code embedded thereon may provide instructions for causing one or more processors to, when executing the instructions, perform one or more of the methods described herein. Program code can be written in any appropriate programming language and delivered to the processor in many forms, including, for example, but not limited to information permanently stored on non-writeable storage media (e.g., read-only memory devices such as ROMs, CD-ROM disks, etc.), information alterably stored on writeable storage media (e.g., hard drives or the like), information conveyed to the processor through communication media, such as a local area network, a public network such as the Internet, or any type of media suitable for storing electronic instruction. When carrying computer readable instructions that implement the various embodiments of the methods described herein, such computer readable media represent examples of various embodiments. In various embodiments, the tangible non-transitory computer readable medium comprises all computer-readable media, and the present invention scope is limited to computer readable media wherein the media is both tangible and non-transitory.

A kit may include any part of the systems described herein and the fluorescence imaging agent such as, for example, a fluorescence dye such as ICG or any suitable fluorescence imaging agent. In further aspects, a kit may include a tangible non-transitory computer readable medium having computer-executable (readable) program code embedded thereon that may provide instructions for causing one or more processors, when executing the instructions, to perform one or more of the methods for characterizing tissue and/or predicting clinical data described herein. The kit may include instructions for use of at least some of its components (e.g., for using the fluorescence imaging agent, for installing the computer-executable (readable) program code with instructions embedded thereon, etc.). In yet further aspects, there is provided a fluorescence imaging agent such as, for example, a fluorescence dye for use in the methods and systems described herein. In further variations, a kit may include any part of or the entire system described herein and a fluorescence agent such as, for example, a fluorescence dye such as ICG, or any other suitable fluorescence agent, or a combination of fluorescence agents.

Example Imaging Agents for Use in Generating Imaging Data

According to some embodiments, in fluorescence medical imaging applications, the imaging agent is a fluorescence imaging agent such as, for example, ICG dye. The fluorescence imaging agent, such as ICG, may be pre-administered to the subject, prior to performing the measurement of signal intensity arising from the fluorescence imaging agent. ICG, when administered to the subject, binds with blood proteins and circulates with the blood in the tissue. The fluorescence imaging agent (e.g., ICG) may be administered to the subject as a bolus injection (e.g., into a vein or an artery) in a concentration suitable for imaging such that the bolus circulates in the vasculature and traverses the microvasculature. In other embodiments in which multiple fluorescence imaging agents are used, such agents may be administered simultaneously, e.g. in a single bolus, or sequentially in separate boluses. The fluorescence imaging agents may be pre-administered to the subject, prior to performing the measurement of signal intensity arising from the fluorescence imaging agent. In some embodiments, the fluorescence imaging agent may be administered by a catheter. In certain embodiments, the fluorescence imaging agent may be administered less than an hour in advance of performing the measurement of signal intensity arising from the fluorescence imaging agent. For example, the fluorescence imaging agent may be administered to the subject less than 30 minutes in advance of the measurement. In yet other embodiments, the fluorescence imaging agent may be administered at least 30 seconds in advance of performing the measurement. In still other embodiments, the fluorescence imaging agent may be administered contemporaneously with performing the measurement.

According to some embodiments, the fluorescence imaging agent may be administered in various concentrations to achieve a desired circulating concentration in the blood. For example, in embodiments where the fluorescence imaging agent is ICG, it may be administered at a concentration of about 2.5 mg/mL to achieve a circulating concentration of about 5 μM to about 10 μM in blood. In various embodiments, the upper concentration limit for the administration of the fluorescence imaging agent is the concentration at which the fluorescence imaging agent becomes clinically toxic in circulating blood, and the lower concentration limit is the instrumental limit for acquiring the signal intensity data arising from the fluorescence imaging agent circulating with blood to detect the fluorescence imaging agent. In various other embodiments, the upper concentration limit for the administration of the fluorescence imaging agent is the concentration at which the fluorescence imaging agent becomes self-quenching. For example, the circulating concentration of ICG may range from about 2 μM to about 10 mM. Thus, in one aspect, the method comprises the step of administration of the imaging agent (e.g., a fluorescence imaging agent) to the subject and acquisition of the signal intensity data (e.g., video) prior to processing the signal intensity data according to the various embodiments. In another aspect, the method excludes any step of administering the imaging agent to the subject.

According to some embodiments, a suitable fluorescence imaging agent for use in fluorescence imaging applications to generate fluorescence image data is an imaging agent which can circulate with the blood (e.g., a fluorescence dye which can circulate with, for example, a component of the blood such as lipoproteins or serum plasma in the blood) and transit vasculature of the tissue (i.e., large vessels and microvasculature), and from which a signal intensity arises when the imaging agent is exposed to appropriate light energy (e.g., excitation light energy, or absorption light energy). In various embodiments, the fluorescence imaging agent comprises a fluorescence dye, an analogue thereof, a derivative thereof, or a combination of these. A fluorescence dye includes any non-toxic fluorescence dye. In certain embodiments, the fluorescence dye optimally emits fluorescence in the near-infrared spectrum. In certain embodiments, the fluorescence dye is or comprises a tricarbocyanine dye. In certain embodiments, the fluorescence dye is or comprises ICG, methylene blue, or a combination thereof. In other embodiments, the fluorescence dye is or comprises fluorescein isothiocyanate, rhodamine, phycoerythrin, phycocyanin, allophycocyanin, o-phthaldehyde, fluorescamine, rose Bengal, trypan blue, fluoro-gold, or a combination thereof, excitable using excitation light wavelengths appropriate to each dye. In some embodiments, an analogue or a derivative of the fluorescence dye may be used. For example, a fluorescence dye analog or a derivative includes a fluorescence dye that has been chemically modified, but still retains its ability to fluoresce when exposed to light energy of an appropriate wavelength.

In various embodiments, the fluorescence imaging agent may be provided as a lyophilized powder, solid, or liquid. In certain embodiments, the fluorescence imaging agent may be provided in a vial (e.g., a sterile vial), which may permit reconstitution to a suitable concentration by administering a sterile fluid with a sterile syringe. Reconstitution may be performed using any appropriate carrier or diluent. For example, the fluorescence imaging agent may be reconstituted with an aqueous diluent immediately before administration. In various embodiments, any diluent or carrier which will maintain the fluorescence imaging agent in solution may be used. As an example, ICG may be reconstituted with water. In some embodiments, once the fluorescence imaging agent is reconstituted, it may be mixed with additional diluents and carriers. In some embodiments, the fluorescence imaging agent may be conjugated to another molecule, such as a protein, a peptide, an amino acid, a synthetic polymer, or a sugar, for example to enhance solubility, stability, imaging properties, or a combination thereof. Additional buffering agents may optionally be added including Tris, HCl, NaOH, phosphate buffer, and/or HEPES.

A person of skill in the art will appreciate that, although a fluorescence imaging agent was described above in detail, other imaging agents may be used in connection with the systems, methods, and techniques described herein, depending on the optical imaging modality. Such fluorescence agents may be administered into body fluid (e.g., lymph fluid, spinal fluid) or body tissue.

In some variations, the fluorescence imaging agent used in combination with the methods, systems and kits described herein may be used for blood flow imaging, tissue perfusion imaging, lymphatic imaging, or a combination thereof, which may performed prior to, during or after an invasive surgical procedure, a minimally invasive surgical procedure, a non-invasive surgical procedure, or a combination thereof. The method of blood flow imaging, tissue perfusion imaging, lymphatic imaging, or a combination thereof, per se may exclude any invasive surgical step. Examples of invasive surgical procedure which may involve blood flow and tissue perfusion include a cardiac-related surgical procedure (e.g., CABG on pump or off pump) or a reconstructive surgical procedure. An example of a non-invasive or minimally invasive procedure includes wound (e.g., chronic wound such as for example pressure ulcers) treatment and/or management. In this regard, for example, a change in the wound over time, such as a change in wound dimensions (e.g., diameter, area), or a change in tissue perfusion in the wound and/or around the peri-wound, may be tracked over time with the application of the methods and systems. Examples of lymphatic imaging include identification of one or more lymph nodes, lymph node drainage, lymphatic mapping, or a combination thereof. In some variations such lymphatic imaging may relate to the female reproductive system (e.g., uterus, cervix, vulva).

In variations relating to cardiac applications, the imaging agent(s) (e.g., ICG alone or in combination with another imaging agent) may be injected intravenously through, for example, the central venous line, bypass pump and/or cardioplegia line to flow and/or perfuse the coronary vasculature, microvasculature and/or grafts. ICG may be administered as a dilute ICG/blood/saline solution down the grafted vessel such that the final concentration of ICG in the coronary artery is approximately the same or lower as would result from injection of about 2.5 mg (i.e., 1 ml of 2.5 mg/ml) into the central line or the bypass pump. The ICG may be prepared by dissolving, for example, 25 mg of the solid in 10 ml sterile aqueous solvent, which may be provided with the ICG by the manufacturer. One milliliter of the ICG solution may be mixed with 500 ml of sterile saline (e.g., by injecting 1 ml of ICG into a 500 ml bag of saline). Thirty milliliters of the dilute ICG/saline solution may be added to 10 ml of the subject's blood, which may be obtained in an aseptic manner from the central arterial line or the bypass pump. ICG in blood binds to plasma proteins and facilitates preventing leakage out of the blood vessels. Mixing of ICG with blood may be performed using standard sterile techniques within the sterile surgical field. Ten ml of the ICG/saline/blood mixture may be administered for each graft. Rather than administering ICG by injection through the wall of the graft using a needle, ICG may be administered by means of a syringe attached to the (open) proximal end of the graft. When the graft is harvested surgeons routinely attach an adaptor to the proximal end of the graft so that they can attach a saline filled syringe, seal off the distal end of the graft and inject saline down the graft, pressurizing the graft and thus assessing the integrity of the conduit (with respect to leaks, side branches etc.) prior to performing the first anastomosis. In other variations, the methods, dosages or a combination thereof as described herein in connection with cardiac imaging may be used in any vascular and/or tissue perfusion imaging applications.

Lymphatic mapping is an important part of effective surgical staging for cancers that spread through the lymphatic system (e.g., breast, gastric, gynecological cancers). Excision of multiple nodes from a particular node basin can lead to serious complications, including acute or chronic lymphedema, paresthesia, and/or seroma formation, when in fact, if the sentinel node is negative for metastasis, the surrounding nodes will most likely also be negative. Identification of the tumor draining lymph nodes (LN) has become an important step for staging cancers that spread through the lymphatic system in breast cancer surgery for example. LN mapping involves the use of dyes and/or radiotracers to identify the LNs either for biopsy or resection and subsequent pathological assessment for metastasis. The goal of lymphadenectomy at the time of surgical staging is to identify and remove the LNs that are at high risk for local spread of the cancer. Sentinel lymph node (SLN) mapping has emerged as an effective surgical strategy in the treatment of breast cancer. It is generally based on the concept that metastasis (spread of cancer to the axillary LNs), if present, should be located in the SLN, which is defined in the art as the first LN or group of nodes to which cancer cells are most likely to spread from a primary tumor. If the SLN is negative for metastasis, then the surrounding secondary and tertiary LN should also be negative. The primary benefit of SLN mapping is to reduce the number of subjects who receive traditional partial or complete lymphadenectomy and thus reduce the number of subjects who suffer from the associated morbidities such as lymphedema and lymphocysts.

The current standard of care for SLN mapping involves injection of a tracer that identifies the lymphatic drainage pathway from the primary tumor. The tracers used may be radioisotopes (e.g. Technetium-99 or Tc-99m) for intraoperative localization with a gamma probe. The radioactive tracer technique (known as scintigraphy) is limited to hospitals with access to radioisotopes require involvement of a nuclear physician and does not provide real-time visual guidance. A colored dye, isosulfan blue, has also been used, however this dye cannot be seen through skin and fatty tissue. In addition, blue staining results in tattooing of the breast lasting several months, skin necrosis can occur with subdermal injections, and allergic reactions with rare anaphylaxis have also been reported. Severe anaphylactic reactions have occurred after injection of isosulfan blue (approximately 2% of patients). Manifestations include respiratory distress, shock, angioedema, urticarial and pruritus. Reactions are more likely to occur in subjects with a history of bronchial asthma, or subjects with allergies or drug reactions to triphenylmethane dyes. Isosulfan blue is known to interfere with measurements of oxygen saturation by pulse oximetry and methemoglobin by gas analyzer. The use of isosulfan blue may result in transient or long-term (tattooing) blue coloration.

In contrast, fluorescence imaging in accordance with the various embodiments for use in SLN visualization, mapping, facilitates direct real-time visual identification of a LN and/or the afferent lymphatic channel intraoperatively, facilitates high-resolution optical guidance in real-time through skin and fatty tissue, visualization of blood flow, tissue perfusion or a combination thereof.

In some variations, visualization, classification or both of lymph nodes during fluorescence imaging may be based on imaging of one or more imaging agents, which may be further based on visualization and/or classification with a gamma probe (e.g., Technetium Tc-99m is a clear, colorless aqueous solution and is typically injected into the periareolar area as per standard care), another conventionally used colored imaging agent (isosulfan blue), and/or other assessment such as, for example, histology. The breast of a subject may be injected, for example, twice with about 1% isosulfan blue (for comparison purposes) and twice with an ICG solution having a concentration of about 2.5 mg/ml. The injection of isosulfan blue may precede the injection of ICG or vice versa. For example, using a TB syringe and a 30 G needle, the subject under anesthesia may be injected with 0.4 ml (0.2 ml at each site) of isosulfan blue in the periareolar area of the breast. For the right breast, the subject may be injected at 12 and 9 o'clock positions and for the left breast at 12 and 3 o'clock positions. The total dose of intradermal injection of isosulfan blue into each breast may be about 4.0 mg (0.4 ml of 1% solution: 10 mg/ml). In another exemplary variation, the subject may receive an ICG injection first followed by isosulfan blue (for comparison). One 25 mg vial of ICG may be reconstituted with 10 ml sterile water for injection to yield a 2.5 mg/ml solution immediately prior to ICG administration. Using a TB syringe and a 30 G needle, for example, the subject may be injected with about 0.1 ml of ICG (0.05 ml at each site) in the periareolar area of the breast (for the right breast, the injection may be performed at 12 and 9 o'clock positions and for the left breast at 12 and 3 o'clock positions). The total dose of intradermal injection of ICG into each breast may be about 0.25 mg (0.1 ml of 2.5 mg/ml solution) per breast. ICG may be injected, for example, at a rate of 5 to 10 seconds per injection. When ICG is injected intradermally, the protein binding properties of ICG cause it to be rapidly taken up by the lymph and moved through the conducting vessels to the LN. In some variations, the ICG may be provided in the form of a sterile lyophilized powder containing 25 mg ICG with no more than 5% sodium iodide. The ICG may be packaged with aqueous solvent consisting of sterile water for injection, which is used to reconstitute the ICG. In some variations the ICG dose (mg) in breast cancer sentinel lymphatic mapping may range from about 0.5 mg to about 10 mg depending on the route of administration. In some variations, the ICG does may be about 0.6 mg to about 0.75 mg, about 0.75 mg to about 5 mg, about 5 mg to about 10 mg. The route of administration may be for example subdermal, intradermal (e.g., into the periareolar region), subareolar, skin overlaying the tumor, intradermal in the areola closest to tumor, subdermal into areola, intradermal above the tumor, periareolar over the whole breast, or a combination thereof. The injections may be prior to visualization and/or classification. The NIR fluorescent positive LNs (e.g., using ICG) may be represented as a black and white NIR fluorescence image(s) for example and/or as a full or partial color (white light) image, full or partial desaturated white light image, an enhanced colored image, an overlay (e.g., fluorescence with any other image), a composite image (e.g., fluorescence incorporated into another image) which may have various colors, various levels of desaturation or various ranges of a color to highlight/visualize certain features of interest. Processing of the images may be further performed for further visualization and/or other analysis (e.g., quantification). The lymph nodes and lymphatic vessels may be visualized (e.g., intraoperatively, in real time) using fluorescence imaging systems and methods according to the various embodiments for ICG and SLNs alone or in combination with a gamma probe (Tc-99m) according to American Society of Breast Surgeons (ASBrS) practice guidelines for SLN biopsy in breast cancer patients. Fluorescence imaging for LNs may begin from the site of injection by tracing the lymphatic channels leading to the LNs in the axilla. Once the visual images of LNs are identified, LN mapping and identification of LNs may be done through incised skin, LN mapping may be performed until ICG visualized nodes are identified. The method of LN mapping per se may exclude any surgical step. For comparison, mapping with isosulfan blue may be performed until 'blue' nodes are identified. LNs identified with ICG alone or in combination with another imaging technique (e.g., isosulfan blue, and/or Tc-99m) may be labeled to be excised. Subject may have various stages of breast cancer (e.g., IA, IB, IIA).

In some variations, such as for example, in gynecological cancers (e.g., uterine, endometrial, vulvar and cervical malignancies), ICG may be administered interstitially for the visualization of lymph nodes, lymphatic channels, or a combination thereof. When injected interstitially, the protein binding properties of ICG cause it to be rapidly taken up by the lymph and moved through the conducting vessels to the SLN. ICG may be provided for injection in the form of a sterile lyophilized powder containing 25 mg ICG (e.g., 25 mg/vial) with no more than 5.0% sodium iodide. ICG may be then reconstituted with commercially available water (sterile) for injection prior to use. According to an embodiment, a vial containing 25 mg ICG may be reconstituted in 20 ml of water for injection, resulting in a 1.25 mg/ml solution. A total of 4 ml of this 1.25 mg/ml solution is to be injected into a subject (4×1 ml injections) for a total dose of ICG of 5 mg per subject. The cervix may also be injected four (4) times with a 1 ml solution of 1% isosulfan blue 10 mg/ml (for comparison purposes) for a total dose of 40 mg. The injection may be performed while the subject is under anesthesia in the operating room. In some variations the ICG dose (mg) in gynecological cancer sentinel lymph node detection and/or mapping may range from about 0.1 mg to about 5 mg depending on the route of administration. In some variations, the ICG does may be about 0.1 mg to about 0.75 mg, about 0.75 mg to about 1.5 mg, about 1.5 mg to about 2.5 mg, about 2.5 mg to about 5 mg. The route of administration may be for example cervical injection, vulva peritumoral injection, hysteroscopic endometrial injection, or a combination thereof. In order to minimize the spillage of isosulfan blue or ICG interfering with the mapping procedure when LNs are to be excised, mapping may be performed on a hemi-pelvis, and mapping with both isosulfan blue and ICG may be performed prior to the excision of any LNs. LN mapping for Clinical Stage I endometrial cancer may be performed according to the NCCN Guidelines for Uterine Neoplasms, SLN Algorithm for Surgical Staging of Endometrial Cancer; and SLN mapping for Clinical Stage I cervical cancer may be performed according to the NCCN Guidelines for Cervical Neoplasms, Surgical/ SLN Mapping Algorithm for Early-Stage Cervical Cancer. Identification of LNs may thus be based on ICG fluorescence imaging alone or in combination or co-administration with for a colorimetric dye (isosulfan blue) and/or radiotracer.

Visualization of lymph nodes may be qualitative and/or quantitative. Such visualization may comprise, for example, lymph node detection, detection rate, anatomic distribution of lymph nodes. Visualization of lymph nodes according to the various embodiments may be used alone or in combination with other variables (e.g., vital signs, height, weight, demographics, surgical predictive factors, relevant medical history and underlying conditions, histological visualization and/or assessment, Tc-99m visualization and/or assessment, concomitant medications). Follow-up visits may occur on the date of discharge, and subsequent dates (e.g., one month).

Lymph fluid comprises high levels of protein, thus ICG can bind to endogenous proteins when entering the lymphatic system. Fluorescence imaging (e.g., ICG imaging) for lymphatic mapping when used in accordance with the methods and systems described herein offers the following example advantages: high-signal to background ratio (or tumor to background ratio) as NIR does not generate significant autofluorescence, real-time visualization feature for lymphatic mapping, tissue definition (i.e., structural visualization), rapid excretion and elimination after entering the vascular system, and avoidance of non-ionizing radiation. Furthermore, NIR imaging has superior tissue penetration (approximately 5 to 10 millimeters of tissue) to that of visible light (1 to 3 mm of tissue). The use of ICG for example also facilitates visualization through the peritoneum overlying the para-aortic nodes. Although tissue fluorescence can be observed with NIR light for extended periods, it cannot be seen with visible light and consequently does not impact pathologic evaluation or processing of the LN. Also, florescence is easier to detect intraoperatively than blue staining (isosulfan blue) of lymph nodes. In other variations, the methods, dosages or a combination thereof as described herein in connection with lymphatic imaging may be used in any vascular and/or tissue perfusion imaging applications.

Tissue perfusion relates to the microcirculatory flow of blood per unit tissue volume in which oxygen and nutrients are provided to and waste is removed from the capillary bed of the tissue being perfused. Tissue perfusion is a phenomenon related to but also distinct from blood flow in vessels. Quantified blood flow through blood vessels may be expressed in terms that define flow (i.e., volume/time), or that define speed (i.e., distance/time). Tissue blood perfusion defines movement of blood through micro-vasculature, such as arterioles, capillaries, or venules, within a tissue volume. Quantified tissue blood perfusion may be expressed in terms of blood flow through tissue volume, namely, that of blood volume/time/tissue volume (or tissue mass). Perfusion is associated with nutritive blood vessels (e.g., micro-vessels known as capillaries) that comprise the vessels associated with exchange of metabolites between blood and tissue, rather than larger-diameter non-nutritive vessels. In some embodiments, quantification of a target tissue may include calculating or determining a parameter or an amount related to the target tissue, such as a rate, size volume, time, distance/time, and/or volume/time, and/or an amount of change as it relates to any one or more of the preceding parameters or amounts. However, compared to blood movement through the larger diameter blood vessels, blood movement through individual capillaries can be highly erratic, principally due to vasomotion, wherein spontaneous oscillation in blood vessel tone manifests as pulsation in erythrocyte movement. In some embodiments, blood flow and tissue perfusion imaging described herein in connection with the systems and methods may be used to image tumor tissue and differentiate such tissue from other tissue.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description features are described herein as part of the same or separate embodiments, however, it will be appreciated that the scope of the invention may include embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A cable for connecting a camera head of a medical imaging device to a medical imaging controller, the cable comprising:
   a first connector located at a distal end of the cable for connecting the cable to the camera head;
   a second connector located at a proximal end of the cable for connecting the cable to the medical imaging controller;
   a circuit board comprising at least one memory, wherein the at least one memory stores at least authentication information associated with the cable and identification information for identifying a medical imaging device that is associated with the cable, and the circuit board is communicatively connected via a communication bus on the circuit board to the second connector for enabling access to the authentication information and the identification information by the medical imaging controller connected to the second connector; and
   one or more imaging communication lines extending between the first connector and the second connector for communicating imaging data from the camera head connected to the first connector to the medical imaging controller connected to the second connector, wherein the one or more imaging communication lines are electrical lines that physically bypass the circuit board entirely.

2. The cable of claim 1, wherein the at least one memory comprises a plurality of memories.

3. The cable of claim 2, wherein the authentication information is stored on a memory of an authentication chip on the circuit board and the identification information is stored on a separate memory on the circuit board.

4. The cable of claim 1, wherein the circuit board comprises one or more processors for facilitating communication between the medical imaging controller and at least a portion of the at least one memory.

5. The cable of claim 4, wherein the one or more processors are configured to facilitate communication of one or more medical imaging device calibration parameters stored in the at least a portion of the at least one memory to the medical imaging controller.

6. The cable of claim 1, further comprising at least one auxiliary communication line extending between the first connector and the circuit board for communicating at least non-imaging data from the medical imaging device to or through the circuit board.

7. The cable of claim 6, wherein the communication bus is communicatively coupled to the second connector and the at least one auxiliary communication line is connected to the communication bus.

8. The cable of claim 7, wherein at least a portion of the at least one memory is directly connected to the communication bus.

9. The cable of claim 1, wherein the circuit board is located in the proximal end of the cable.

10. The cable of claim 1, wherein the circuit board is integrally formed as part of the cable.

11. The cable of claim 10, wherein the circuit board is overmolded to protect the circuit board during sterilization of the cable.

12. The cable of claim 1, further comprising a second circuit board located proximate the first connector.

13. The cable of claim 1, wherein the at least one memory stores at least one of medical imaging device run time, medical imaging device type, medical imaging device usage count, medical imaging device button operation count, cable identification information, cable type, medical imaging device identification information, medical imaging device calibration information, and medical imaging device pixel compensation information.

14. The cable of claim 13, further comprising one or more imaging control lines extending between the first connector and the second connector for communicating imaging control signals from a medical imaging controller connected to the second connector to a medical imaging device connected to the first connector, wherein the one or more imaging control lines bypass the communication bus of the circuit board.

15. The cable of claim 1, wherein the first connector is configured for connecting to at least one of an endoscope camera head, a medical microscope camera head, and an open field medical camera head.

16. The cable of claim 1, wherein the one or more imaging communication lines are configured for communicating at least one of pixel data and voxel data.

17. An apparatus comprising a medical imaging device that comprises a camera head connected to a cable, the cable comprising:
a first connector located at a distal end of the cable and connecting the cable to the camera head;
a second connector located at a proximal end of the cable for connecting the cable to a medical imaging controller;
a circuit board comprising at least one memory, wherein the at least one memory stores at least authentication information associated with the cable and identification information for identifying a medical imaging device that is associated with the cable, and the circuit board is communicatively connected via a communication bus on the circuit board to the second connector for enabling access to the authentication information and the identification information by the medical imaging controller connected to the second connector; and
one or more imaging communication lines extending between the first connector and the second connector for communicating imaging data from the camera head connected to the first connector to the medical imaging controller connected to the second connector, wherein the one or more imaging communication lines are electrical lines that physically bypass the circuit board entirely.

* * * * *